US012242217B2

(12) United States Patent
Fujikawa et al.

(10) Patent No.: US 12,242,217 B2
(45) Date of Patent: Mar. 4, 2025

(54) IMAGE FORMING SYSTEM, IMAGE FORMING APPARATUS, AND FIXING DEVICE

(71) Applicant: CANON KABUSHIKI KAISHA, Tokyo (JP)

(72) Inventors: Tomoki Fujikawa, Shizuoka (JP); Tadashi Fukumuro, Shizuoka (JP); Yuji Fujiwara, Boise, ID (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/172,100

(22) Filed: Feb. 21, 2023

(65) Prior Publication Data

US 2023/0273553 A1 Aug. 31, 2023

(30) Foreign Application Priority Data

Feb. 28, 2022 (JP) ................................ 2022-029562
Sep. 2, 2022 (JP) ................................ 2022-140091

(51) Int. Cl.
*G03G 15/20* (2006.01)
*G03G 15/00* (2006.01)

(52) U.S. Cl.
CPC ....... *G03G 15/205* (2013.01); *G03G 15/5045* (2013.01)

(58) Field of Classification Search
CPC ............. G03G 15/2039; G03G 15/205; G03G 15/2042; G03G 15/5045; G03G 15/553; G06F 3/1231
USPC ...................................................... 399/12, 13
See application file for complete search history.

(56) References Cited

U.S. PATENT DOCUMENTS

| | | | | |
|---|---|---|---|---|
| 2016/0216653 | A1 | 7/2016 | Yajima et al. | |
| 2020/0133179 | A1* | 4/2020 | Fukamachi ........ | G03G 15/2017 |
| 2020/0264818 | A1* | 8/2020 | Okuzumi ........... | G03G 21/1892 |

FOREIGN PATENT DOCUMENTS

| | | | |
|---|---|---|---|
| JP | 2007188032 | A | 7/2007 |
| JP | 2015060208 | A | 3/2015 |
| JP | 2017054073 | A | 3/2017 |
| JP | 2018045223 | A | 3/2018 |
| JP | 2020134930 | A | 8/2020 |

* cited by examiner

*Primary Examiner* — Hoang X Ngo
(74) *Attorney, Agent, or Firm* — ROSSI, KIMMS & McDOWELL LLP

(57) ABSTRACT

In an image forming system including an apparatus main-body and a control portion which controls a fixing operation, to the apparatus main-body, a first fixing unit including a first heater and a second fixing unit including a second heater, which is different from the first heater, can be selectively attached, and each of the first and second fixing units has an information processing portion which transmits data including identification information and temperature information related to a temperature detected by a temperature detection element to the control portion, and the control portion discriminates which of the first fixing unit and the second fixing unit, the fixing unit attached to the apparatus main-body is on the basis of the identification information from the information processing portion and controls the fixing operation by the fixing unit on the basis of the temperature information.

28 Claims, 14 Drawing Sheets

IMAGE FORMING SYSTEM, IMAGE FORMING APPARATUS, AND FIXING DEVICE

BACKGROUND OF THE INVENTION

Field of the Invention

The present invention relates to an image forming apparatus such as a copier, a printer and the like using an electrophotographic system. Moreover, the present invention relates to an image heating device such as a fixer mounted in the image forming apparatus or a glossing device or the like which improves glossiness of a toner image by re-heating a toner image fixed on a recording material.

Description of the Related Art

A fixer mounted on an image forming apparatus such as a copier, a printer and the like is constituted as a fixing unit which is replaceable with respect to an apparatus main-body in case of reaching a life, a failure, and the like in some cases. Moreover, replacement can be made with a fixing unit with control information between at shipment and at replacement (Japanese Patent Application Publication No. 2020-134930) and a fixing unit with a different heater width (Japanese Patent Application Publication No. 2017-054073) in accordance with an application.

SUMMARY OF THE INVENTION

In order to perform a fixing operation according to the fixing unit, transmission of a type of the fixing unit to the image forming apparatus is required.

An object of the present invention is to provide an art which can transmit a type of the fixing unit with a simple configuration.

In order to achieve the aforementioned object, an image forming system of the present invention includes:

- an apparatus main-body including an image forming portion which forms an image on a recording material; and
- a control portion which controls a fixing operation for fixing the image formed on the recording material,
- wherein the apparatus main-body is configured such that a first fixing unit including a first heater and a second fixing unit including a second heater different from the first heater can be selectively attached,
- wherein the first fixing unit includes:
  - a first temperature detection element which detects a temperature of the first heater; and
  - a first information processing portion which acquires first temperature information related to a temperature detected by the first temperature detection element, and in a case where the first fixing unit is attached to the apparatus main-body, the first information processing portion transmits first data including first identification information related to a type of the first fixing unit and the first temperature information to the control portion;
- wherein the second fixing unit includes:
  - a second temperature detection element which detects a temperature of the second heater; and
  - a second information processing portion which acquires second temperature information related to a temperature detected by the second temperature detection element, and in a case where the second fixing unit is attached to the apparatus main-body, the second information processing portion transmits second data including second identification information related to a type of the second fixing unit and the second temperature information to the control portion, and
- wherein the control portion
  - discriminates that the fixing unit attached to the apparatus main-body is the first fixing unit on the basis of the first identification information included in the first data and controls the fixing operation by the first fixing unit on the basis of the first temperature information included in the first data, or
  - discriminates that the fixing unit attached to the apparatus main-body is the second fixing unit on the basis of the second identification information included in the second data and controls the fixing operation by the second fixing unit on the basis of the second temperature information included in the second data.

In order to achieve the aforementioned object, an image forming apparatus of the present invention includes:

- an image forming portion which forms an image on a recording material;
- a fixing unit including a heater and a temperature detection element which detects a temperature of the heater; and
- a control portion which controls a fixing operation for fixing the image on the recording material,
- wherein the fixing unit has an information processing portion which acquires temperature information related to a temperature detected by the temperature detection element,
- wherein the information processing portion transmits data including identification information related to a type of the fixing unit and the temperature information to the control portion, and
- wherein the control portion discriminates a type of the fixing unit on the basis of the identification information included in the data and controls the fixing operation by the fixing unit on the basis of the temperature information included in the data.

In order to achieve the aforementioned object, a fixing device which can be mounted on the image forming apparatus of the present invention includes:

- a heater;
- a temperature detection element which detects a temperature of the heater; and
- an information processing portion which acquires temperature information related to a temperature detected by the temperature detection element, the information processing portion transmitting data including identification information related to a type of the fixing device and the temperature information to the image forming apparatus.

In order to achieve the aforementioned object, an image forming system of the present invention includes:

- an apparatus main-body including an image forming portion which forms an image on a recording material; and
- a control portion which controls a fixing operation for fixing the image formed on the recording material,
- wherein the apparatus main-body is configured such that a first fixing unit including a first heater and a second fixing unit including a second heater different from the first heater can be selectively attached, wherein the first fixing unit includes:

a plurality of first temperature detection elements which detect a temperature of the first heater; and a first information processing portion which acquires first temperature information related to a temperature detected by the plurality of first temperature detection elements, and in a case where the first fixing unit is attached to the apparatus main-body, the first information processing portion transmits first data including the first temperature information to the control portion, wherein the second fixing unit includes:

a plurality of second temperature detection elements which detect a temperature of the second heater; and a second information processing portion which acquires second temperature information related to a temperature detected by the plurality of second temperature detection elements, and in a case where the second fixing unit is attached to the apparatus main-body, the second information processing portion transmits second data including the second temperature information to the control portion, wherein the first temperature information is a plurality of pieces of corresponding temperature information corresponding to a temperature detected by the plurality of first temperature detection elements, wherein the second temperature information is a plurality of pieces of corresponding temperature information corresponding to a temperature detected by the plurality of second temperature detection elements, wherein the number of pieces of the corresponding temperature information included in the first data and the number of pieces of the corresponding temperature information included in the second data are different, wherein at least either one of the first data and the second data includes non-corresponding temperature information in addition to the corresponding temperature information, and wherein the control portion discriminates that the fixing unit attached to the apparatus main-body is the first fixing unit on the basis of the number of pieces of the corresponding temperature information included in the first data and controls the fixing operation by the first fixing unit on the basis of the first temperature information included in the first data, or discriminates that the fixing unit attached to the apparatus main-body is the second fixing unit on the basis of the number of pieces of the corresponding temperature information included in the second data and controls the fixing operation by the second fixing unit on the basis of the second temperature information included in the second data.

In order to achieve the aforementioned object, an image forming apparatus of the present invention includes:

an image forming portion which forms an image on a recording material;

a fixing unit including a heater and a plurality of temperature detection elements which detect a temperature of the heater; and a control portion which controls a fixing operation for fixing the image on the recording material, wherein the fixing unit has an information processing portion, wherein the information processing portion acquires temperature information related to a temperature detected by the plurality of temperature detection elements and transmits data including the temperature information to the control portion, wherein the temperature information is a plurality of pieces of corresponding temperature information corresponding to a temperature detected by the plurality of temperature detection elements, wherein the data includes non-corresponding temperature information in addition to the corresponding temperature information, and wherein the control portion discriminates a type of the fixing unit on the basis of the number of pieces of the corresponding temperature information included in the data and controls the fixing operation by the fixing unit on the basis of the temperature information included in the data.

In order to achieve the aforementioned object, a fixing device which can be mounted on the image forming apparatus of the present invention includes:

a heater;

a plurality of temperature detection elements which detect a temperature of the heater; and an information processing portion which acquires temperature information related to a temperature detected by the plurality of temperature detection elements and transmits data including the temperature information to the image forming apparatus, wherein the temperature information is a plurality of pieces of corresponding temperature information corresponding to a temperature detected by the plurality of temperature detection elements; and wherein the data includes non-corresponding temperature information in addition to the corresponding temperature information.

According to the present invention, a type of the fixing unit can be transmitted with a simple configuration.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

Embodiment 1

Configuration of Image Forming Apparatus

Figure 1:
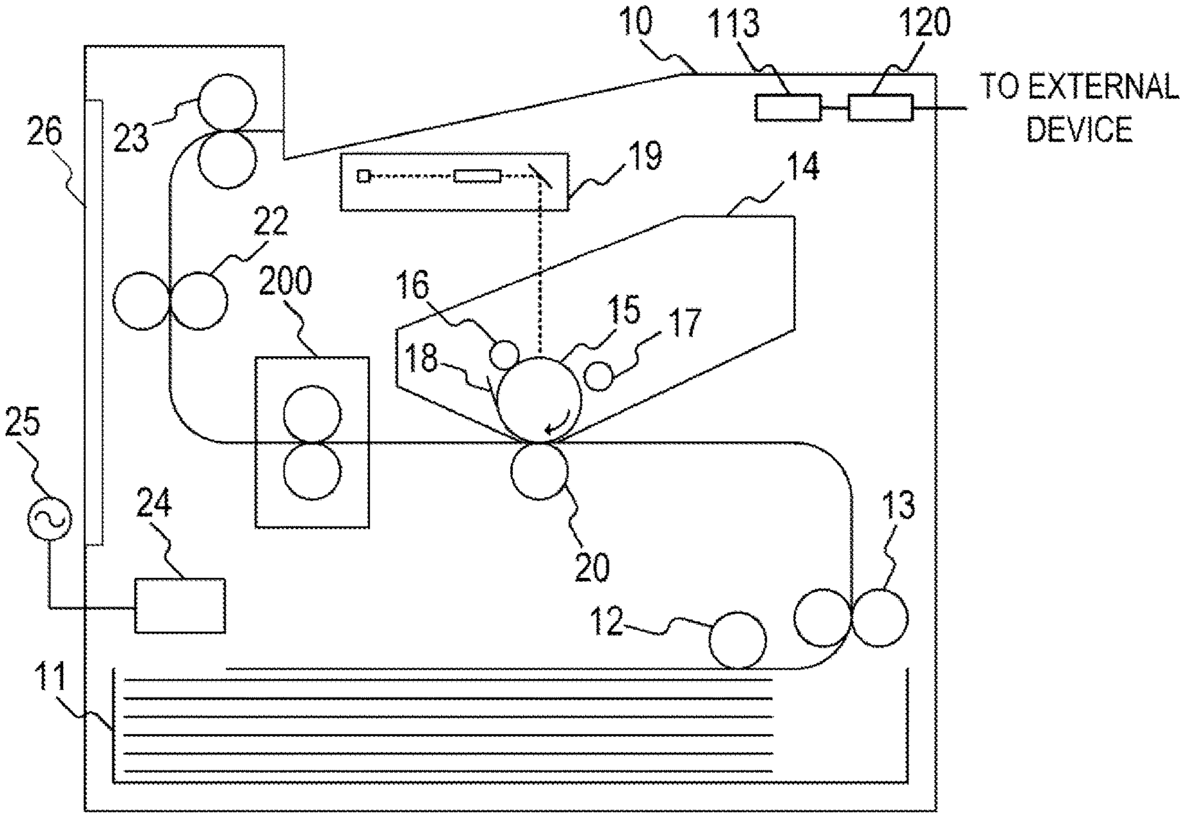
FIG. 1 is a sectional view of an image forming apparatus in Embodiments 1 to 3.

FIG. 1 is a configuration diagram exemplifying an image forming apparatus of an electrophotographic system in this embodiment. As the image forming apparatuses to which the present invention can be applied include a copier, a printer and the like using the electrophotographic system or an electrostatic recording system, and a case in which application to a laser printer which forms an image on a recording material by using the electrophotographic system will be described, here. In this embodiment, a monochrome printer including a single image forming portion is exemplified, but a type of the image forming apparatus to which the present invention can be applied is not limited to that. For example, the present invention can be applied also to a color laser printer including a plurality of image forming portions and using toners in plural colors different from each other (yellow (Y), magenta (M), cyan (C), black (K), for example).

The image forming apparatus 10 includes a video controller 120 and a control portion 113. The video controller 120, as an acquiring portion which acquires information of an image to be formed on a recording material (recording paper), receives and process image information a print instruction transmitted from an external device such as a host computer or the like. The control portion 113 is connected to the video controller 120 and controls each portion constituting the image forming apparatus in accordance with the instruction from the video controller 120.

An image forming operation in the image forming apparatus 10 will be explained. The recording material such as paper, a sheet or the like is fed by a paper-feed roller 12 one by one from a paper-feed tray 11 and is conveyed to a process cartridge 14 by a conveyance roller 13 at predetermined timing. Moreover, the process cartridge 14 incorporates a photosensitive drum 15, a charging unit 16, and a developing unit 17. On the photosensitive drum 15, the charging unit 16 is disposed in pressure contact, and a surface of the photosensitive drum 15 is uniformly charged by this charging unit 16. After that, exposure based on the image information is performed by a scanner unit 19, which is an exposure unit, and an electrostatic latent image is formed on the surface of the photosensitive drum 15. On a downstream side in a rotation direction of the photosensitive drum 15 rather than a position of the exposure, the developing unit 17 is included. When the electrostatic latent image formed on the photosensitive drum 15 comes to a position opposed to the developing unit 17, a toner is supplied from the developing unit 17 to the electrostatic latent image, and a toner image (visible image) is formed on the photosensitive drum 15.

On the other hand, the recording material is conveyed at timing synchronized with a moving speed of the toner image formed on the photosensitive drum 15, and the recording material having reached the photosensitive drum 15 has the toner image on the photosensitive drum 15 transferred by a transfer nip constituted by a pressure contact portion of the photosensitive drum 15 and a transfer roller 20.

Moreover, the recording material on which the toner image has been transferred is conveyed to a fixing device 200 as an image heating device having a heater including a heat-generating body (resistance heat-generating body). The fixing device 200 is constituted by two rollers opposed and brought into pressure contact with each other and fixes the toner image on the recording material by heating processing using heat of the heater and pressurizing processing by a fixation nip. By supplying power to the fixing device 200 from a power supply unit 24 connected to a commercial AC power source 25, the heat-generating body inside the fixing device 200 is heated. In the image forming apparatus 10, the fixing device 200 (second fixing unit) can be detachably attached in a state where a door 26 is open, and can be replaced with a fixing device 600 (first fixing unit). That is, the image forming apparatus 10 of this embodiment is constituted such that any one of a plurality of types of fixing devices (fixing units) with configurations (types) different from each other can be selectively attached to an apparatus main-body. In this embodiment, two types of the fixing devices (fixing device 200, fixing device 600) will be explained, but three types or more of the fixing devices may be constituted to be detachably attached.

After that, the recording material is ejected by paper-ejection rollers 22, 23 to outside the machine, and a series of print operations is finished. Reference numeral 18 denotes a cleaning unit which cleans the photosensitive drum 15.

Here, in this embodiment, an operation for forming a fixed image on the recording material, that is, an operation combining a forming operation of an unfixed toner image on the recording material by the image forming portion on the upstream of the fixing device and a fixing operation of the toner image on the recording material by the fixing device is assumed to be the image forming operation. The mage forming apparatus in this embodiment performs the image forming operation with different control contents according to the type of the fixing device attached to the apparatus main body.

Moreover, the image forming apparatus is not limited to that exemplified in FIG. 1 but may be an image forming apparatus including a plurality of image forming portions, for example. Moreover, it may be an image forming apparatus including a primary transfer portion which transfers the toner image on the photosensitive drum 15 to an intermediate transfer belt and a secondary transfer portion which transfers the toner image on the intermediate transfer belt to a sheet.

Configuration of Fixing Device 200

Figure 2:
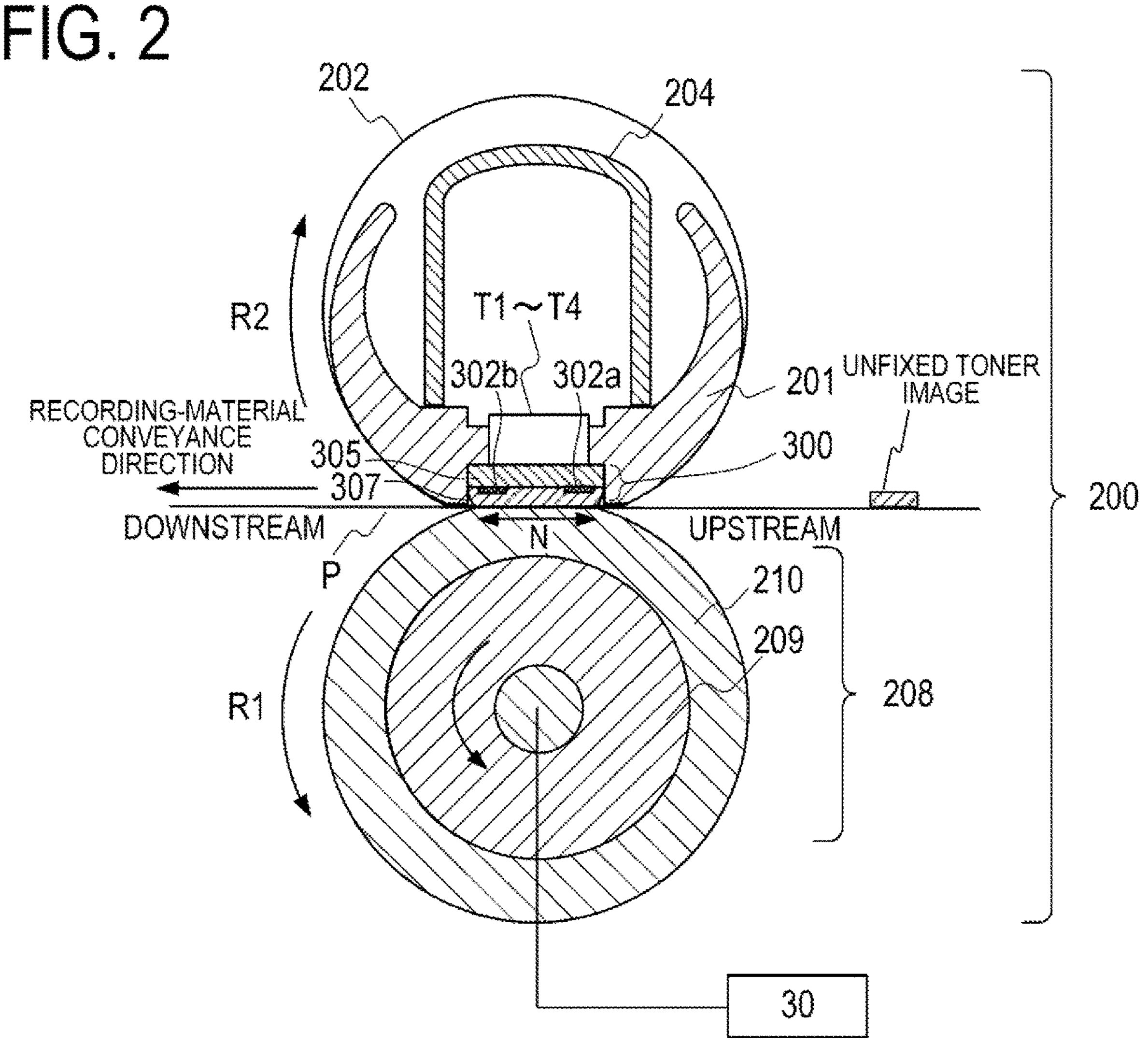
FIG. 2 is a sectional view of a fixing device 200 in Embodiments 1 to 3.

FIG. 2 is a sectional view of the fixing device 200. The fixing device 200 has a cylindrical film (endless belt) 202, a heater 300 (second heater) in contact with an inner surface of the film 202, and a pressurizing roller (nip-portion forming member) 208 which forms a fixation nip portion N with the heater 300 through the film 202. A material ofa base layer of the film 202 is a heat-resistant resin such as polyimide or the like or metal such as stainless or the like. Moreover, an elastic layer such as a heat-resistant rubber or the like may be provided on a surface layer of the film 202. The pressurizing roller 208 has a core metal 209 of a material such as iron, aluminum or the like and an elastic layer 210 of a material such as silicone rubber or the like. The heater 300 is held by a holding member 201 made of a heat-resistant resin. The holding member 201 also has a guide function for guiding rotation of the film 202. The pressurizing roller 208 rotates in an arrow R1 direction by receiving power from a motor 30. By means of rotation of the pressurizing roller 208, the film 202 is driven and is rotated in an arrow R2 direction. A recording material P bearing the unfixed toner image is heated and fixation-processed while being sandwiched/conveyed by the fixation nip portion N.

The heater 300 is a heater heated by a resistance heat-generating body 302 (302*a*, 302*b*) provided on a surface (hereinafter, this surface is defined as a front surface) on a side opposite to a side in contact with the holding member 201 of a board 305 made of ceramic. The heat-generating bodies 302*a*, 302*b* are covered by a protective glass 307 from above. On the board 305 surface made of ceramic of the heater 300, thermistors T1, T2, T3, T4, (second temperature detection element) which are temperature detecting elements, are brought into contact therewith, and other than the above, temperature protection elements such as thermo switches, not shown, are also brought into contact. Note that the thermistors T1 to T4 are temperature detection elements, and the temperature detection element is not limited to a contact-type thermistor.

Reference numeral 204 denotes a stay made of metal for applying a pressure of a spring, not shown, to the holding member 201. Note that the fixing device 200 in this embodiment is explained as a ceramic heater, but this is not limiting. For example, a fixing device using a halogen heater can be used.

Configuration of Heater 300

Figure 3A:
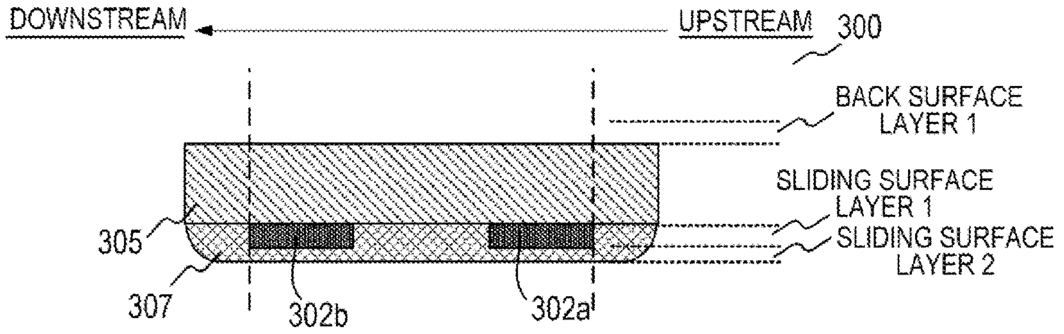
FIGS. 3A and 3B are heater configuration diagrams of the fixing device 200 in Embodiments 1 to 3.
Figure 3B:
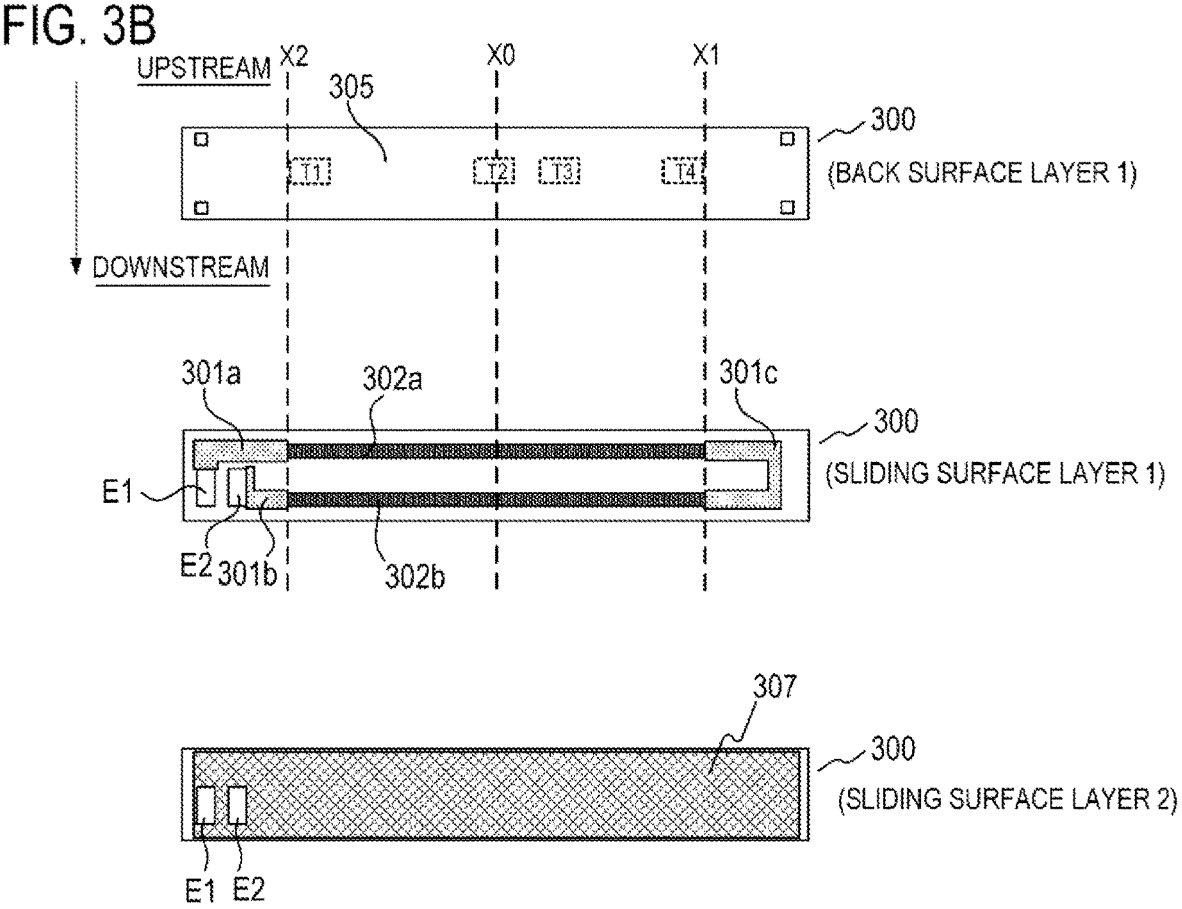

FIGS. 3A and 3B are configuration diagrams of the heater 300. FIG. 3A shows a sectional diagram in a short-side direction (direction orthogonal to a longitudinal direction of the heater 300) of the heater 300 in the vicinity of X0, which is a conveyance reference position shown in FIG. 3B. The conveyance reference position X0 is defined as a reference position when the recording material P is conveyed. In this embodiment, conveyance is performed such that a center part in a width direction of the recording material P passes the conveyance reference position X0.

The heater 300 has the heat-generating bodies 302*a*, 302*b* provided along the longitudinal direction (width direction orthogonal to the conveyance direction of the recording material P) of the heater 300 on a sliding surface layer 1, which is a first surface on the board 305. The heat-generating body 302*a* is disposed on an upstream side in the conveyance direction of the recording material P, and a conductive body 301*b* is disposed on a downstream side. And the heat-generating bodies 302*a*, 302*b* are covered with the protective glass 307 from above.

FIG. 3B is a plan view of the heater 300. The heat-generating bodies 302*a*, 302*b* on the sliding surface layer 1 are disposed in parallel along the longitudinal direction and constitute a heat-generation region X1-X2 as a single heat generation block. And the heat-generating bodies 302*a*, 302*b* are connected to electrodes E1, E2 through the conductive bodies 301*a*, 301*b*, 301*c*. Power supply to the heater 300 is performed through the electrodes E1, E2. The protective glass 307, which is a surface protective layer on a sliding surface layer 2 covers a region except the electrodes E1, E2. T1, T2, T3, T4 indicated by dotted-line frames indicate thermistors T1 to T4 shown in FIG. 2, and the thermistors T1 to T4 using a material having a high positive (PTC) or negative (NTC) TCR characteristic (NTC in this embodiment) are in contact in order to detect a temperature of the heater 300. The thermistors T1, T4 are placed on both end portions of the heat-generation region X1-X2, the thermistor T2 in the vicinity of the center of the heater 300, and the thermistor T3 at a position corresponding to an end portion at conveyance of a small-sized paper.

Circuit Diagram of Fixing Device 200

Figure 4:
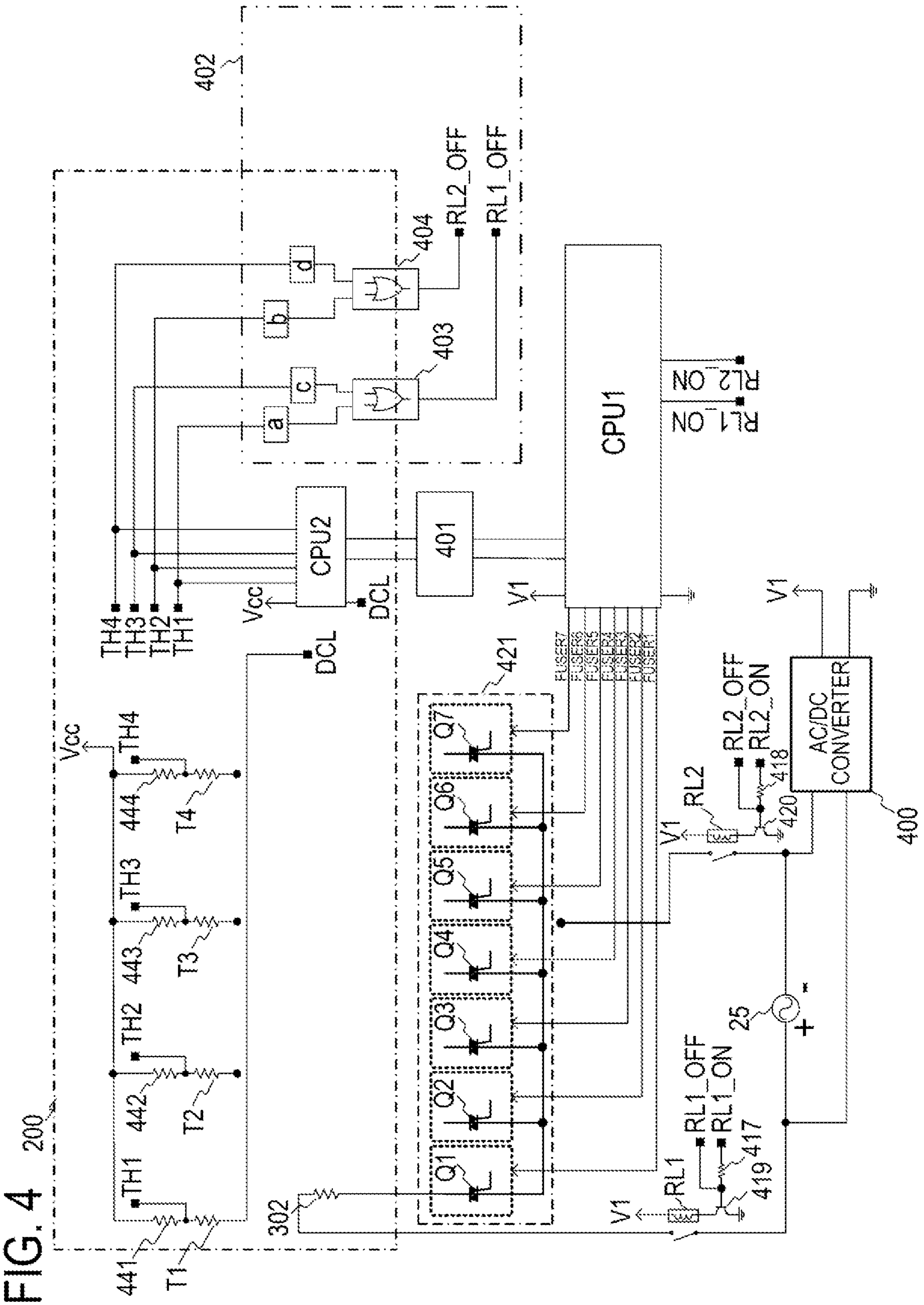
FIG. 4 is a power-supply circuit diagram to the fixing device 200 in Embodiments 1 to 3.

FIG. 4 is a circuit diagram of a power supply circuit to the fixing device 200 as an example of the power supply unit 24 in FIG. 1. The power supply circuit shows a circuit which supplies power to the heat-generating body 302 inside the fixing device 200 from the AC power source 25 and controls so that a predetermined temperature is reached. A CPU 1 is a constituent element of a part of the control portion 113 of the image forming apparatus and is in charge of drive of the control circuit. An ACDC converter 400 is a switching power-supply circuit which supplies a stable voltage V1 from the AC power source 25. The voltage V1 is supplied to the CPU 1, and the CPU 1 controls a drive element, not shown, of the image forming apparatus 10, an image forming process, and a temperature of the fixing device 200. A CPU 2 is a control portion (second information processing portion) provided in the fixing device 200 and is configured to monitor the temperature of the thermistor and capable of transmitting temperature information to the CPU 1. The CPU 1 and the CPU 2 conduct insulation communication via an insulation communication unit 401.

A protection circuit block 402 is a circuit which operates to stop power supply to the heat-generating body 302 on the basis of TH1 to TH4 signals. The protection circuit block 402 shows abnormality detecting units a to d, a protection circuit 403, and a protection circuit 404. In the protection circuit 403, the abnormality detecting unit a and the abnormality detecting unit c are connected, and the protection circuit 403 is constituted by an abnormality transmitting unit 408 and a latch circuit 406. In the protection circuit 404, the abnormality detecting unit b and the abnormality detecting unit d are connected, and the protection circuit 404 is constituted by an abnormality transmitting unit 409 and a latch circuit 407.

When power is supplied from the AC power source 25 connected to the image forming apparatus 10 to the heat-generating body 302 inside the heater 300 through a relay RL1, a relay RL2, and a triac Q1, the heat-generating body 302 generates heat.

An operation of the relay RL1 will be described. Reference numerals 417, 418 denote resistors, and reference numerals 419, 420 denote NPN transistors. The relay RL1 is controlled by an RL1_ON signal output from the CPU 1. When the RL1_ON signal is High, the NPN transistor 419 for relay drive is turned ON, whereby the RL1 is turned ON, while when the RL1_ON signal is Low, the NPN transistor 419 is turned OFF, whereby the RL1 is turned OFF. The relay RL2 operates on the basis of an RL2_ON signal output from the CPU 1. A detailed operation is similar to that of the relay RL1 and omitted.

A drive portion 421 will be explained. The drive portion 421 is constituted by elements including triacs Q1 to 7, and when the heater generates heat, each of the triacs is brought into an ON state.

Figure 5A:
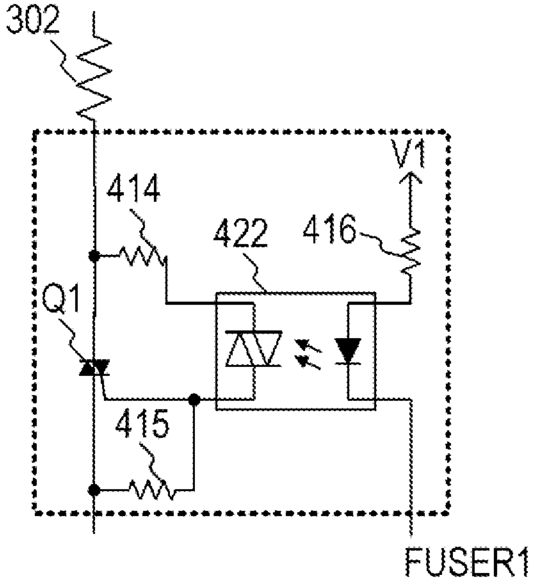
FIGS. 5A and 5B are power-supply circuit diagrams to the fixing device 200 in Embodiments 1 to 3.

FIG. 5A shows an example of a Q1 part in FIG. 4. Reference numerals 414 to 416 denote resistors, and reference numeral 422 denotes a photo-triac coupler. Power control of the heat-generating body 302 is performed by conduction/shut-off of the triac Q1, which is a semiconductor switching element. The triac Q1 is controlled by a FUSER1 signal output from the CPU 1, and reinforced insulation (reinforced insulation also includes double insulation) by the photo-triac coupler 422 is conducted. When the FUSER1 signal is brought into a Low state, an electric current flows to a secondary-side diode of the photo-triac coupler 422, and a primary-side triac of the photo-triac coupler 422 is operated. Then, a trigger current flows to a gate terminal of the triac Q1 through the resistor 414 or the resistor 415, and the triac Q1 is brought into an ON state. The other Q2 to Q7 parts also have the configuration similar to that of Q1.

Temperature detection by the thermistors T1 to T4 will be explained. Reference character $V_{CC}$ denotes a stable voltage with DCL as a reference. The temperature detected by the thermistor T1 is detected by the CPU 2 as a TH1 signal, which is a voltage obtained by dividing the voltage $V_{CC}$ by a resistor 441 and the thermistor T1. Similarly, the temperature detected by the thermistor T2 is detected by the CPU 2 as a TH2 signal, which is a voltage obtained by dividing the voltage $V_{CC}$ by a resistor 442 and the thermistor T2. Similarly, the temperature detected by the thermistor T3 is detected by the CPU 2 as a TH3 signal, which is a voltage obtained by dividing the voltage $V_{CC}$ by a resistor 443 and the thermistor T3. Similarly, the temperature detected by the thermistor T4 is detected by the CPU 2 as a TH4 signal, which is a voltage obtained by dividing the voltage $V_{CC}$ by a resistor 444 and the thermistor T4.

Figure 5B:
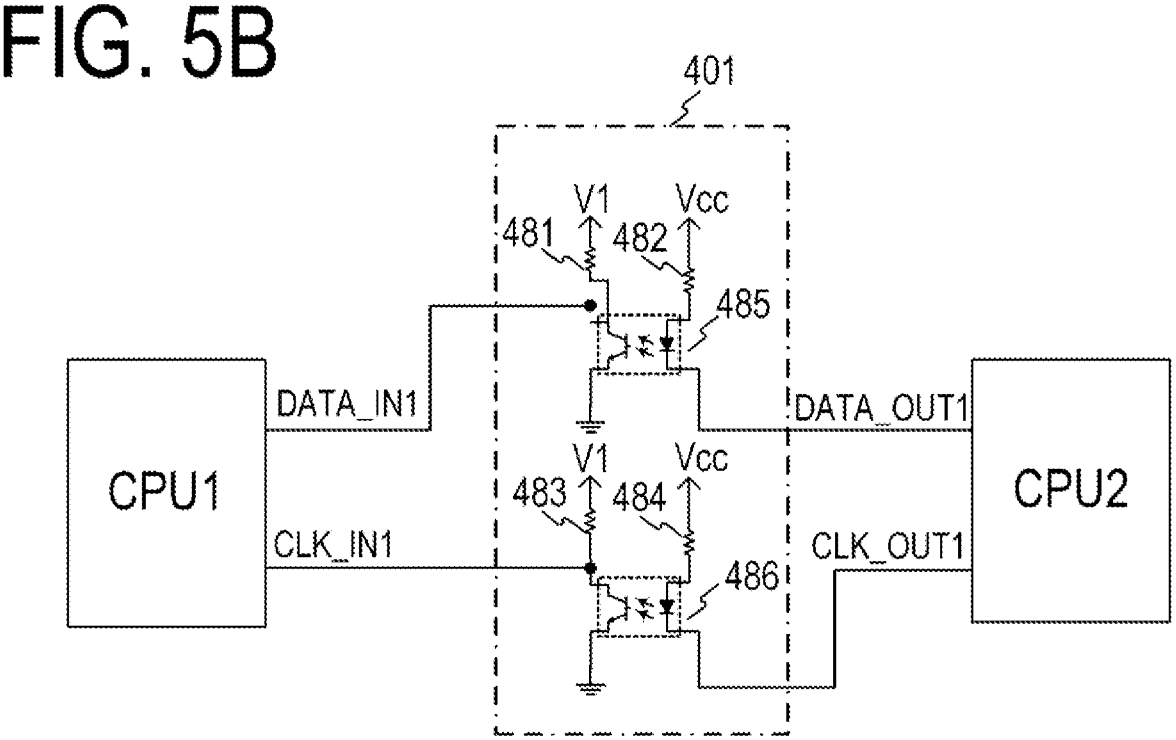

FIG. 5B illustrates an example of an insulation communication part between the CPU 1 and the CPU 2 in FIG. 4. The insulation communication unit 401 is constituted by resistors 481 to 484, photocouplers 485, 486. The temperature information detected by the CPU 2 is output as a CLK-OUT1 signal a DATA_OUT1 signal, and data transmission is performed to the CPU 1 as a CLK_IN1 signal, a DATA_IN1 signal, respectively. The CLK_OUT1 signal, the DATA_OUT1 signal and the CLK_IN1 signal, the DATA_IN1 signal are insulated by the photocoupler 485, the photocoupler 486. FIG. 5B illustrates a double-wire type unilateral communication method, but other communication methods represented by I2C, UART, SPI and the like, a bilateral communication method, a single-wire type unilateral communication method may be also used.

As described above, the temperature information (second temperature information) of the heater 300 detected by the thermistors T1 to T4 is transmitted from the CPU 2 to the CPU 1, and the CPU 1 executes control of power supplied from the AC power source 25 to the heat-generating body 302 on the basis of the temperature information. In the internal processing of the CPU 1, power to be supplied is calculated by PI control, for example, on the basis of a set temperature (predetermined control target temperature) of the heater 300 and the temperature information of the thermistor. Moreover, after conversion to a control level of a phase angle (phase control) corresponding to the power to be supplied, wave number (wave-number control), the triac Q1 is controlled by the control conditions.

Configuration of Fixing Device 600

Figure 6:
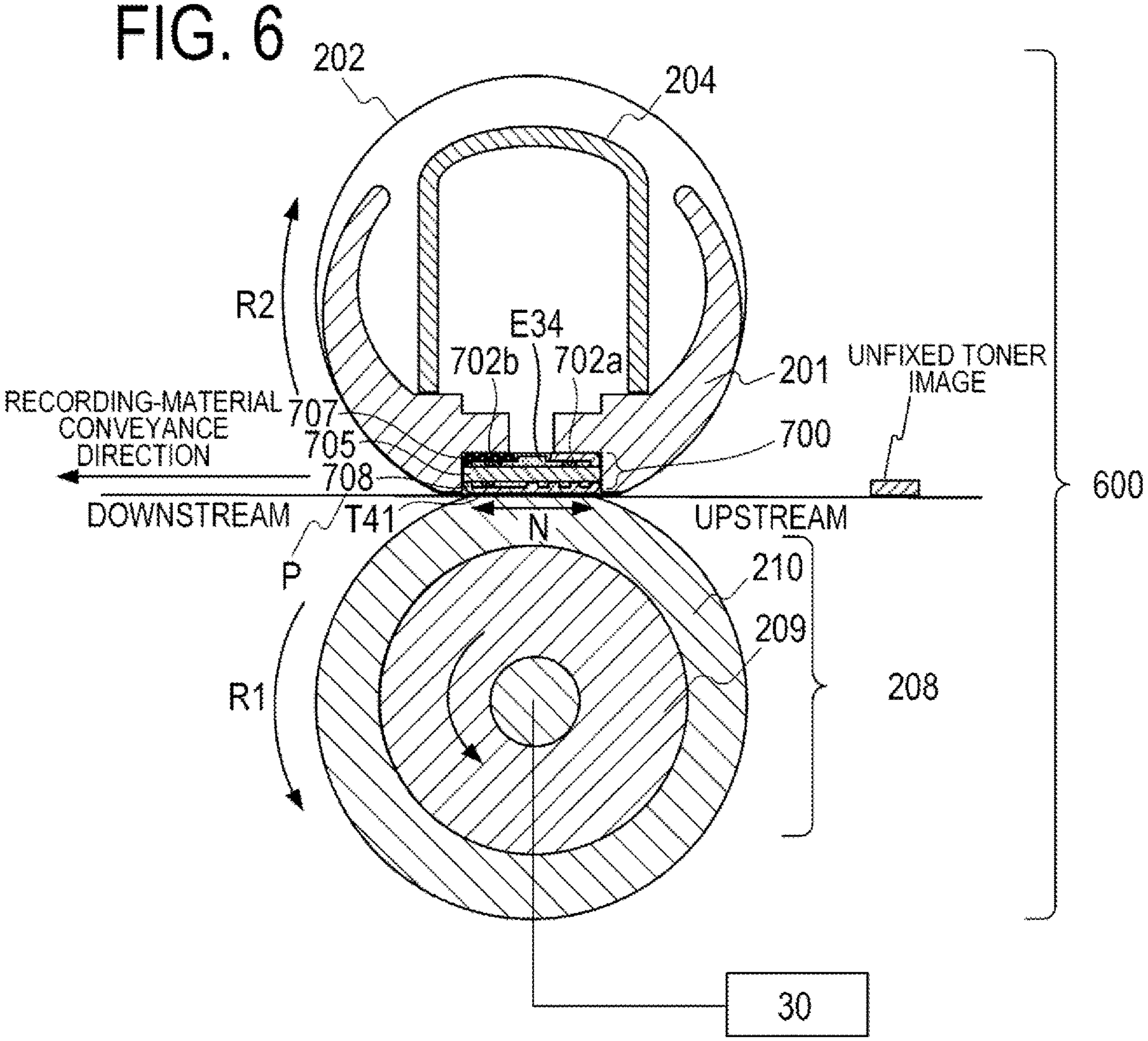
FIG. 6 is a sectional view of a fixing device 600 in Embodiments 1 to 3.

FIG. 6 is a sectional view of the fixing device 600. The fixing device 600 has a configuration capable of independent control of heat generation blocks HB1 to HB7 as compared with the fixing device 200. By controlling temperatures of the heat generation blocks HB1 to HB7 on the basis of a recording material size, a temperature rise of a non paper-passing portion in the case of passing of small-sized paper can be suppressed. The fixing device 600 has electrodes (here, an electrode E34 is shown as a representative) provided on a side opposite to the fixation nip portion N and electric contacts (not shown) provided in plural, and power is fed to each electrode from each electric contact.

A heater 700 (first heater) is a heater heated by a heat-generating body 702 (702*a*, 702*b*) provided on a back surface side of a board 705. A surface protective layer 707 is glass used for insulating the heat-generating body 702. On a sliding surface side of the board 705, thermistors T41 (T11 to T71, and T12 to T72) (first temperature detection element) are provided. A surface protective layer 708 is glass used to protect the thermistor T41 (T11 to T71 and T12 to T72) and to obtain a sliding performance of the fixation nip portion N.

Configuration of Heater 700

Figure 7A:
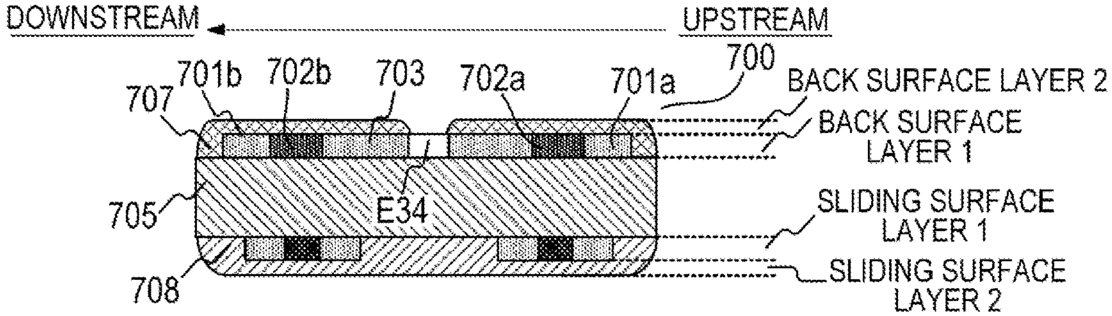
FIGS. 7A and 7B are heater configuration diagrams of the fixing device 600 in Embodiments 1 to 3.
Figure 7B:
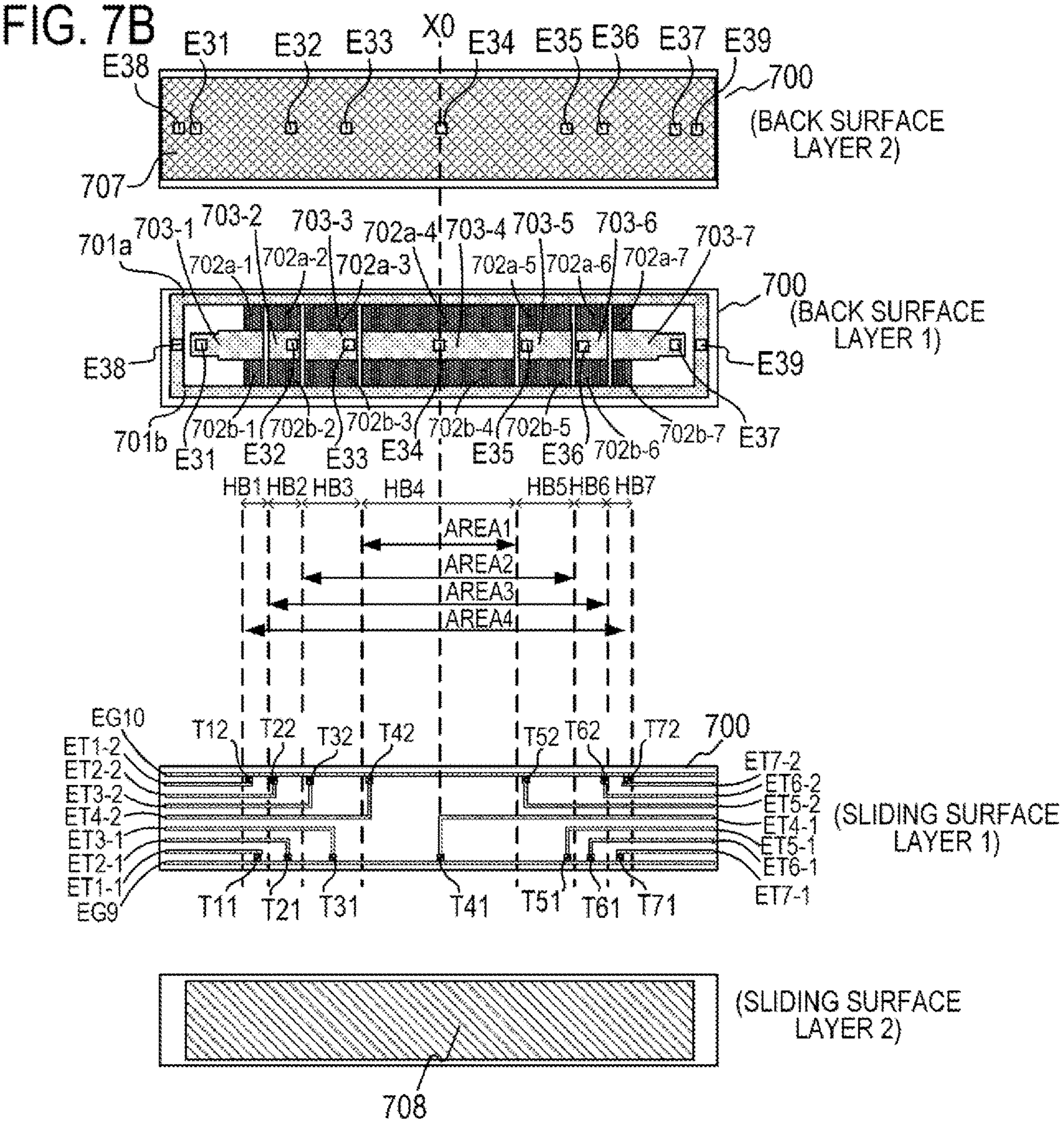

FIGS. 7A and 7B are configuration diagrams of the heater 700. FIG. 7A illustrates a sectional view in the vicinity of a conveyance reference position X0 shown in FIG. 7B in a short-side direction (direction orthogonal to the longitudinal direction of the heater 700) of the heater 700.

The heater 700 has a first conductor 701 and a second conductor 703 on the board 705. The first conductor 701 is provided on the board 705 along the longitudinal direction (width direction orthogonal to the conveyance direction of the recording material P) of the heater 700. The second conductor 703 (703-4) is provided on the board 705 along the longitudinal direction of the heater 700 at a position different from the first conductor 701 (701*a*, 701*b*) in the short-side direction of the heater 700. The first conductor 701 is divided into the conductor 701*a* disposed on an upstream side in the conveyance direction of the recording material P and the conductor 701*b* disposed on a downstream side. Moreover, the heat-generating body 702 is provided between the first conductor 701 and the second conductor 703 and generates heat by power supplied through the first conductor 701 and the second conductor 703.

The heat-generating body 702 is divided into the heat-generating body 702*a* disposed on the upstream side in the conveyance direction of the recording material P and the heat-generating body 702*b* disposed on the downstream side. When heat generation distribution in the short-side direction (conveyance direction of the recording material P) of the heater 700 becomes asymmetrical, a stress generated in the board 705 becomes larger when the heater 700 generates heat. When the stress generated in the board 705 becomes larger, a crack can occur in the board 705 in some cases. Thus, the heat-generating body 702 is divided into the heat-generating body 702*a* disposed on the upstream side in the conveyance direction and the heat-generating body 702*b* disposed on the downstream side so that the heat generation distribution in the short-side direction of the heater 700 becomes symmetrical. Moreover, on a back surface layer 2 of the heater 700, the insulating (glass in this embodiment)

surface protective layer 707 covering the heat-generating body 702, the first conductor 701 (701*a*, 701*b*), and the second conductor 703 (703-4) is provided by avoiding the electrode portion (E34).

FIG. 7B illustrates a plan view of each layer of the heater 700. On a back surface layer 1 of the heater 700, heat generation blocks, each constituted by a set of the first conductor 701, the second conductor 703, and the heat-generating body 702, are provided in plural in the longitudinal direction of the heater 700. The heater 700 in this embodiment has seven heat generation blocks HB1 to HB7 in total at a center part and both end parts in the longitudinal direction of the heater 700. The heat generation blocks HB1 to HB7 are constituted by heat-generating bodies 702*a*-1 to 702*a*-7 and heat-generating bodies 702*b*-1 to 702*b*-7 formed symmetrically in the short-side direction of the heater 700, respectively. The first conductor 701 is constituted by the conductor 701*a* connected to the heat-generating bodies (702*a*-1 to 702*a*-7) and the conductor 701*b* connected to the heat-generating bodies (702*b*-1 to 702*b*-7). Similarly, the second conductor 703 is divided into seven conductors 703-1 to 703-7 in order to correspond to the seven heat generation blocks HB1 to HB7.

The electrodes E31 to E37 are electrodes used for power supply to the heat generation blocks HB1 to HB 7 through the conductors 703-1 to 703-7, respectively. The electrodes E38 and E39 are electrodes used for connection to a common electric contact used for power feed to the seven heat generation blocks HB1 to HB7 through the conductor 701*a* and the conductor 701*b*.

Moreover, the surface protective layer 707 of the back surface layer 2 of the heater 700 is formed by excluding spots of the electrodes E31 to E39 and is constituted so that the electric contact, not shown, can be connected. And power can be fed independently to each of the heat generation blocks, respectively, and power-feed control can be executed independently. By dividing into the seven heat generation blocks as above, as AREA1 to AREA4, four paper-passing regions can be formed. In this embodiment, the AREA1 is classified for A5-sized paper, the AREA2 for B5-sized paper, the AREA3 for A4-sized paper, and the AREA4 for Letter-sized paper. Since the seven heat generation blocks can be independently controlled, the heat generation block to which power is fed is selected in accordance with the size of the recording material P. The number of the heat generation regions or the number of the heat generation blocks is not limited by the number in this embodiment. Moreover, the heat-generating bodies 702*a*-1 to 702*a*-7, 702*b*-1 to 702*b*-7 in each of the heat generation blocks are not limited to a continuous pattern as described in this embodiment but may have a strip-shaped pattern with gap portions provided.

On the sliding surface layer 1 of the heater 700, the thermistors T11 to T71 and T12 to T72 are installed in order to detect a temperature of each of the heat generation blocks HB1 to HB7 of the heater 700. Since two or more thermistors are provided for all the heat generation blocks HB1 to HB7, even if one thermistor fails, the temperatures of all the heat generation blocks can be detected.

In order to conduct each of the thermistors T11 to T71 and T12 to T72, conductors ET1-1 to ET7-1 and ET1-2 to ET7-2 for detecting a resistance value of the thermistor and common conductors EG9 and EG10 of the thermistors are formed.

On the sliding surface (surface in contact with the film 202) layer 2 of the heater 700, the surface protective layer 708 by glass coating with sliding characteristics is provided. The surface protective layer 708 is provided in a region sliding at least with the film 202 except the end portions of the heater 700 in order to provide electric contacts on the conductors ET1-1 to ET7-1, ET1-2 to ET7-2 for resistance-value detection of the thermistor and the conductors EG9 and EG10.

Circuit Diagram of Fixing Device 600

Figure 8:
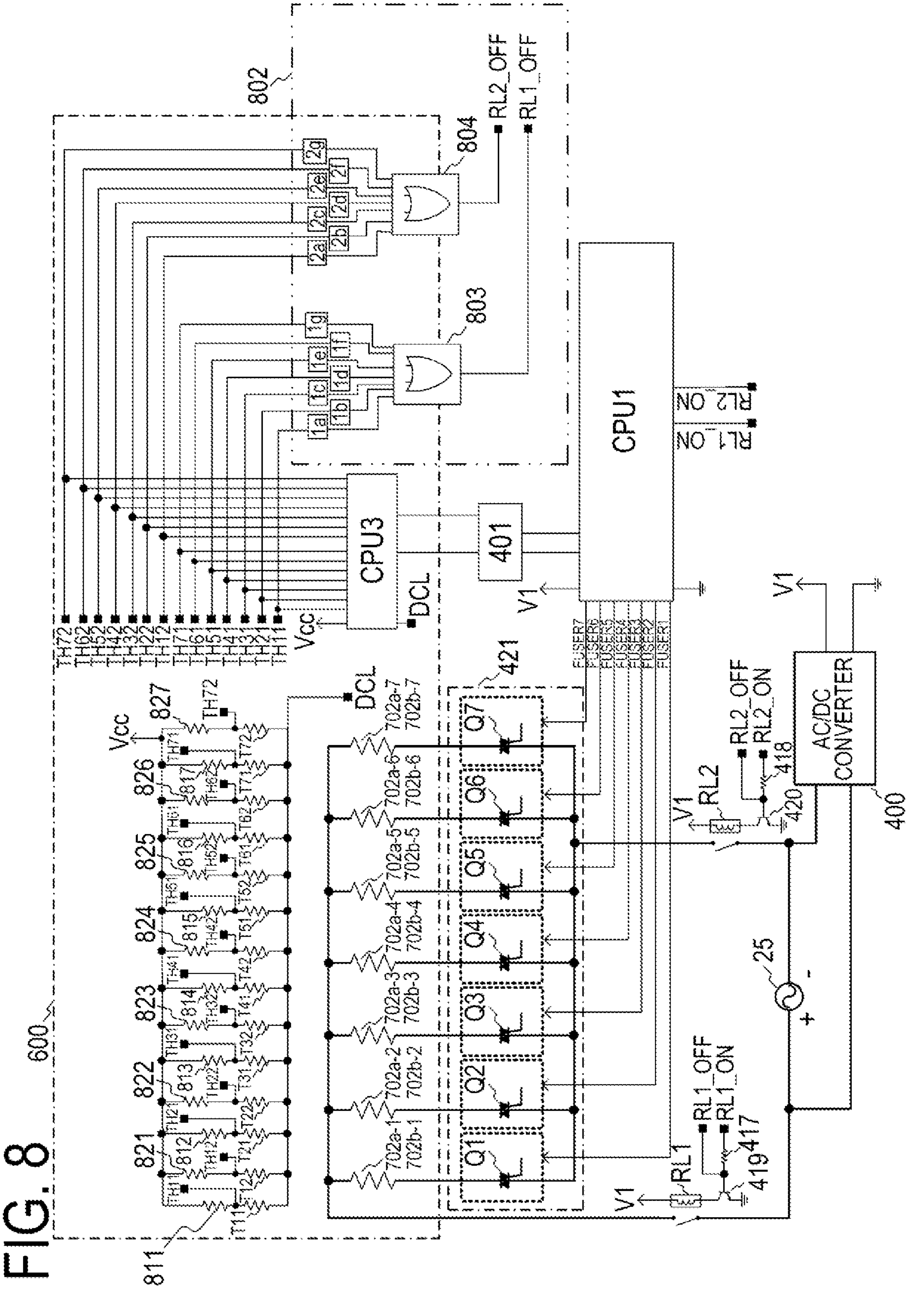
FIG. 8 is a power-supply circuit diagram to the fixing device 600 in Embodiments 1 to 3.

FIG. 8 illustrates a circuit diagram of a power supply circuit to the fixing device 600 in Embodiment 3. The power supply circuit shows a circuit that supplies power to the heat-generating body 702 inside the fixing device 600 from the AC power source 25 and controls so that a predetermined temperature is reached. For parts in common with FIG. 4 and FIGS. 5A and 5B, explanation will be omitted.

The CPU 1 executes power control of switching portions (RL1, RL2, Q1 to 7) on the basis of the temperature information (first temperature information) of the thermistor acquired by the insulation communication unit 401 from the CPU 3, which is a control portion (first information processing portion) provided in the fixing device 600. The configurations of RL1, RL2 are common as in FIG. 4.

A protection circuit block 802 is a circuit which stops power supply to the heat-generating body 702 on the basis of TH11 to TH71 signals and TH12 to TH72 signals. The protection circuit block 802 is constituted by abnormality detecting units 1*a* to 1*g* and 2*a* to 2*g*, a pulse detection circuit 805, a protection circuit 803, and a protection circuit 804. The protection circuit 803 has the abnormality detecting units 1*a* to 1*g* connected thereto and is constituted by an abnormality transmitting unit 808 and a latch circuit 806. The protection circuit 804 has the abnormality detecting units 2*a* to 2*g* connected thereto and is constituted by an abnormality transmitting unit 809 and a latch circuit 807.

By power supply from the AC power source 25 connected to the image forming apparatus 10 to the relays RL1, RL2, the heat-generating bodies 702 inside the heater 700, the heat-generating bodies 702 (702*a*-1, 702*b*-1) generates heat. When the heat-generating bodies 702*a*-1 and 702*b*-1 are caused to generate heat, the relay RL1, the relay RL2, and the triac Q1 are operated. Moreover, when the other heat-generating bodies 702-2 to 702-7 are caused to generate heat, the triacs Q2 to Q7 are operated, respectively. Since operations of the relay RL1, the relay RL2, the triacs Q1 to Q7 are similar to those in FIG. 4 and FIG. 5A, explanation will be omitted.

Subsequently, the temperature detection by the thermistors T11 to T71 and the thermistors T12 to T72 will be explained. Each of the thermistor temperatures is detected by the following signals obtained by the CPU 3 by dividing the stable voltage $V_{CC}$ with DCL as a reference:

Temperature detected by the thermistor T11: TH11 signal, which is a voltage divided by a resistor 811 and the thermistor T11

Temperature detected by the thermistor T21: TH21 signal, which is a voltage divided by a resistor 812 and the thermistor T21

Temperature detected by the thermistor T31: TH31 signal, which is a voltage divided by a resistor 813 and the thermistor T31

Temperature detected by the thermistor T41: TH41 signal, which is a voltage divided by a resistor 814 and the thermistor T41

Temperature detected by the thermistor T51: TH51 signal, which is a voltage divided by a resistor 815 and the thermistor T51

Temperature detected by the thermistor T61: TH61 signal, which is a voltage divided by a resistor 816 and the thermistor T61

Temperature detected by the thermistor T71: TH71 signal, which is a voltage divided by a resistor 817 and the thermistor T71

Temperature detected by the thermistor T12: TH12 signal, which is a voltage divided by a resistor 821 and the thermistor T12

Temperature detected by the thermistor T22: TH22 signal, which is a voltage divided by a resistor 822 and the thermistor T22

Temperature detected by the thermistor T32: TH32 signal, which is a voltage divided by a resistor 823 and the thermistor T32

Temperature detected by the thermistor T42: TH42 signal, which is a voltage divided by a resistor 824 and the thermistor T42

Temperature detected by the thermistor T52: TH52 signal, which is a voltage divided by a resistor 825 and the thermistor T52

Temperature detected by the thermistor T62: TH62 signal, which is a voltage divided by a resistor 826 and the thermistor T62

Temperature detected by the thermistor T72: TH72 signal, which is a voltage divided by a resistor 827 and the thermistor T72

The configuration of the insulation communication between the CPU 1 and the CPU 3 is similar to that in FIG. 5B.

Configuration for Discriminating Fixer

A configuration for discriminating which of the fixing devices 200, 600 is attached will be explained by using a functional block diagram in FIGS. 9A and 9B and Tables 1, 2.

Figure 9A:
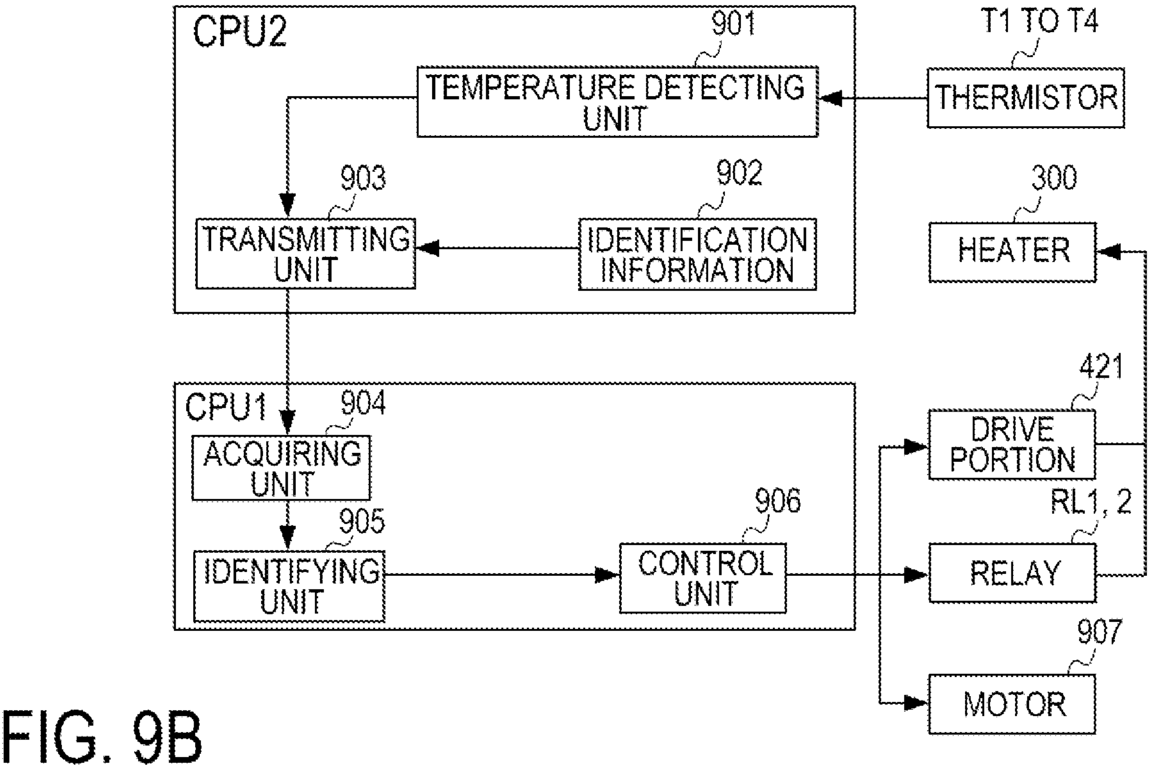
FIGS. 9A and 9B are control block diagrams of Embodiment 1.

FIG. 9A is a functional block diagram when the fixing device 200 is attached. The CPUs 1, 2 include a ROM, a RAM, a timer and the like, not shown. The CPU 2 includes a temperature detecting unit 901, identification information 902, and a transmitting unit 903. Moreover, the CPU 1 includes an acquiring unit 904, an identifying unit 905, and a control unit 906.

The temperature detecting unit 901 detects temperatures of the thermistors T1 to T4 as AD values from the TH1 to TH4 signals, which are voltages. The identification information 902 (second data) is ROM data indicating an ID of the fixing device 200, and 1 (second identification information) is recorded therein. The transmitting unit 903 converts the AD value detected by the temperature detecting unit 901 and the ID of the identification information 902 to data to be transmitted to the CPU 1 and transmits the data by the insulation communication unit 401. Note that the AD value here is a temperature detected when the fixing device 200 is brought into a conduction state in which electric connection is made with the apparatus main-body. By providing the temperature information to the main body side at attachment of the fixing device 200, the temperature of the heater can be monitored before the heater is electrically conducted. An example of the data to be transmitted is shown in Table 1.

TABLE 1

Transmission data of fixing device 200

| Item | Value [HEX] |
|---|---|
| Data number | 0007 |
| ID | 0001 |
| TH1 | 003C |
| TH2 | 003A |
| TH3 | 0035 |
| TH4 | 0034 |
| CRC | 6FE6 |

Each data is data of a 2-byte size. The data number indicates the total number of pieces of data to be transmitted. The ID is ROM data of the identification information 902. TH1 to 4 are the AD values detected by the temperature detecting unit 901. CRC is data of a cyclic redundancy check and is used for error detection of communication data as an error detecting code. An initial value is 0x0000, and a generator polynomial is 0x8005. The CRC is calculated from the data number, the ID, the data of TH1 to 4. The CRC is used as the data for error detection in this embodiment, but this is not limiting, and a checksum may be used or the initial value and the generator polynomial may be different values.

The acquiring unit 904 receives the data transmitted by the transmitting unit 903. The acquiring unit 904 calculates the CRC from the received data number (a second number of pieces of data), the ID, the information of TH1 to 4, compares them whether they match the CRC (second error detecting code) of the received data and determines right or wrong of the data. As a result of the comparison, if they match, it is adopted as correct data. If not, it is read and discarded as data including an error. The identifying unit 905 determines that the fixing device 200 is attached since the ID of the data received by the acquiring unit 904 is 1. The control unit 906 executes heating control of the heater 300 by driving the relays RL1, 2, the motor 907, the drive portion 421 in accordance with the attached fixer by the identifying unit 905.

Figure 9B:
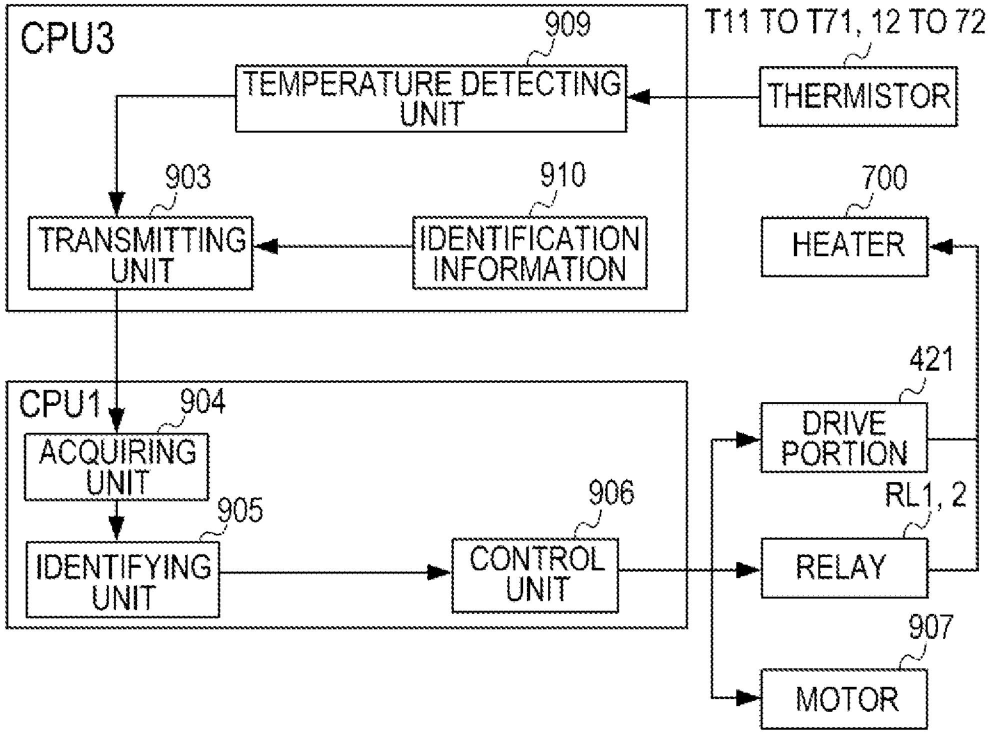

FIG. 9B is a functional block diagram when the fixing device 600 is attached. The CPU 3 includes a ROM, a RAM, a timer and the like, not shown. The CPU 3 includes a temperature detecting unit 909, identification information 910, and the transmitting unit 903. The CPU 1 is similar to that in FIG. 9A.

The temperature detecting unit 909 detects temperatures of the thermistors T11 to T71, T12 to T72 as AD values of the TH11 to TH71 and TH12 to TH72 signals, which are voltages. The identification information 910 (first data) is ROM data indicating an ID of the fixing device 600, and 2 (first identification information) is recorded. The transmitting unit 903 converts the AD value detected by the temperature detecting unit 909 and the ID of the identification information 910 to data to be transmitted to the CPU 1 and transmits the data by the insulation communication unit 401. An example of the data to be transmitted is shown in Table 2.

TABLE 2

Transmission Data of Fixing Device 600

| Item | Value [HEX] |
|---|---|
| Data number | 0010 |
| ID | 0002 |
| TH11 | 0034 |

TABLE 2-continued

| Transmission Data of Fixing Device 600 | |
|---|---|
| Item | Value [HEX] |
| TH21 | 0039 |
| TH31 | 003B |
| TH41 | 003C |
| TH51 | 003A |
| TH61 | 0038 |
| TH71 | 0033 |
| TH12 | 002A |
| TH22 | 002F |
| TH32 | 0031 |
| TH42 | 0032 |
| TH52 | 0030 |
| TH62 | 002E |
| TH72 | 0029 |
| CRC | 376A |

The acquiring unit 904 receives the data transmitted by the transmitting unit 903. The acquiring unit 904 calculates CRC from information of the received data number (a first number of pieces of data), the ID, the TH11 to 17, 12 to 72 and compares it to see if it matches the CRC (first error detection code) of the received data. As the result of comparison, if it matches, it is adopted as correct data. If not, it is read and discarded as data containing an error. Since the ID of the data received by the acquiring unit 904 is 2, the identifying unit 905 determines that the fixing device 600 is attached. The control unit 906 drives relays RL1, 2, the motor 907, the drive portion 421 and executes heating control of the heater 700 in accordance with the fixer determined by the identifying unit 905.

Flowchart for Discriminating Fixer

Figure 10:
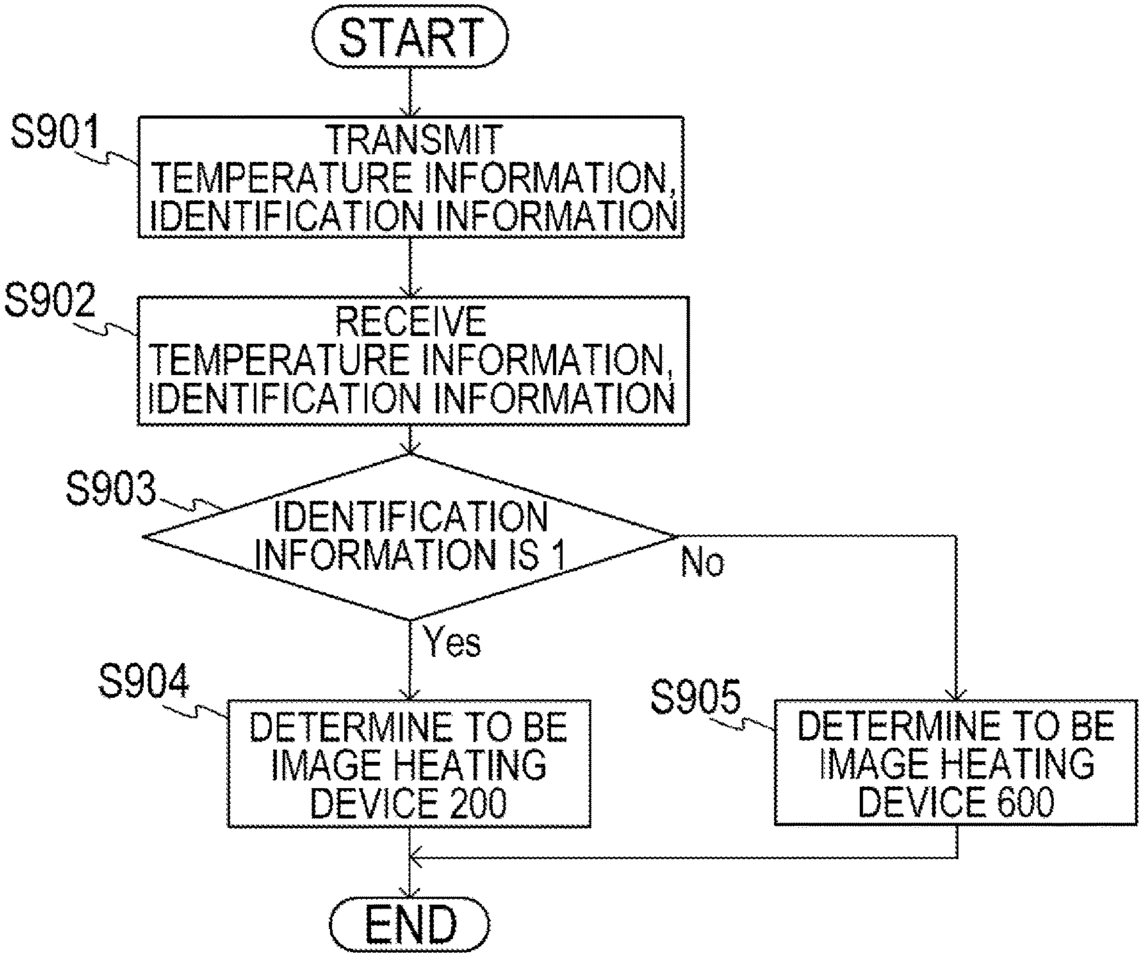
FIG. 10 is a flowchart of Embodiment 1.

A flowchart for discriminating which one of the fixers with different division number of the heater is attached is shown in FIG. 10. When the fixing device 200 is attached at S901, the transmitting unit 903 of the CPU 2 converts the AD value detected by the temperature detecting unit 901 and the ID of the identification information 902 to the data to be transmitted to the CPU 1 and transmits the data by the insulation communication unit 401. Moreover, when the fixing device 600 is attached, the transmitting unit 903 of the CPU 3 converts the AD value detected by the temperature detecting unit 909 and the ID of the identification information 910 to the data to be transmitted to the CPU 1 and transmits the data by the insulation communication unit 401. At S902, the acquiring unit 904 of the CPU 1 receives the data transmitted by the insulation communication unit 401 from the CPU 2 or the CPU 3. If the identification information of the received data is 1 at S903, the identifying unit 905 of the CPU 1 determines at S904 that the fixing device 200 is attached. If the identification information of the received data is not 1 at S903, it is determined at S905 that the fixing device 600 is attached.

As described above, in the image forming apparatus of this embodiment, the CPU 1, which is a control portion of the apparatus main-body, discriminates a type of the fixing device on the basis of the information included in the data transmitted from the CPU 2, which is the information processing portion provided in the fixing device. Moreover, the fixing operation by the fixing device is controlled on the basis of the temperature information included in the data transmitted from the CPU 2. According to the configuration as above, it is possible to discriminate which one of the fixers with different division number of the heater is attached. Furthermore, as compared with a configuration of direct connection between the apparatus main-body and the fixing device (that is, a configuration in which each of the plurality of thermistors is directly connected to the CPU 1), the number of signal lines required for the transmission of the temperature information can be reduced, which leads to reduction of a space on a device configuration. By transmitting the identification information of the fixer together with the temperature information of the thermistor, addition of a port or a memory is not needed. Moreover, by adding error detection information such as CRC, discrimination of the fixer can be performed with accuracy.

In this embodiment, the identification information and the temperature information of the thermistor are transmitted at the same time, but they may be transmitted separately.

Moreover, it was assumed that the identification information of the fixing device 200 is 1 and the identification information of the fixing device 600 is 2, but if the data numbers to be transmitted are different, the data number itself may be used as the identification information. That is, the CPU 1 may discriminate the type of the fixing device attached to the apparatus main-body on the basis of the number of pieces of data (the first number of pieces of data, the second number of pieces of data) transmitted from the CPU 2 and CPU3.

Moreover, the CPU 1, 2, 3 may be ASIC or FPGA. Furthermore, the division number of the heater or the thermistor number is not limited to the fixing devices 200, 600 but may be any number. That is, as an image forming system in which a plurality of fixing units are selectively replaceable with respect to the apparatus main-body of the image forming apparatus, two types of the fixing devices 200, 600 are exemplified as the types of the fixing units that can be attached to the apparatus main-body, but the number of types may be three types or more.

Embodiment 2

In Embodiment 2 of the present invention, a configuration of switching control in accordance with the type of discriminated fixer will be explained. Since the configurations of the image forming apparatus and the image heating device in Embodiment 2 are similar to those in Embodiment 1, they will be omitted, here.

For example, the control unit 906 can make determination on presence/absence of a failure of the thermistor by the acquired temperature information of the thermistor such that, if the temperature abnormally rises, it is high-temperature abnormality, and if the temperature does not rise even if heating is performed, it is low-temperature abnormality.

Figure 11:
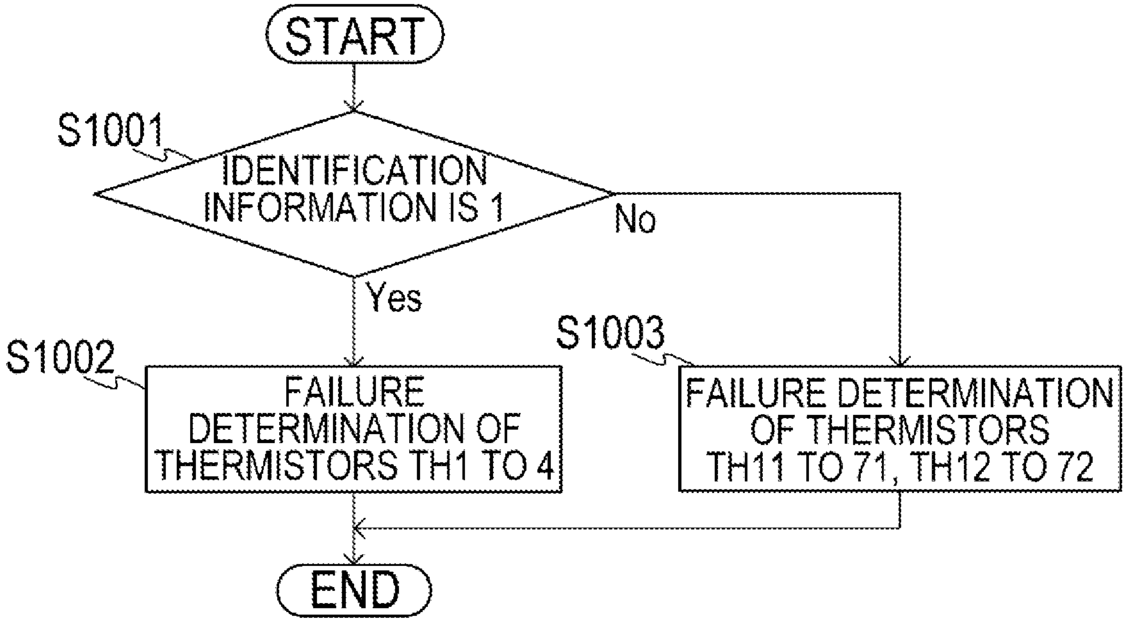
FIG. 11 is a flowchart of Embodiment 2.

FIG. 11 is a flowchart along which the thermistor failure determination is made in accordance with the discriminated fixer. The control unit 906 determines whether the identification information is 1 or not (S1001). If the identification information is 1, the thermistor failure determination is made for TH1 to 4 (S1002). If the identification information is not 1, the thermistor failure determination is made for TH11 to 71, TH12 to 72 (S1003)

As described above, by switching the thermistor failure determination in accordance with the discriminated fixer, the failure determination suitable for the fixer can be made.

Note that, as the thermistor failure determination, determination may be made depending on whether the number of pieces of the temperature information matches the identification information or not.

Moreover, the control of switching in accordance with the fixer is not limited to the thermistor failure determination but may be applied to temperature control in the fixing operation.

For example, it may be so configured that the heat-generating body to be heated is selected in accordance with the recording-material width, and a non paper-passing portion temperature suppression/temperature control for lowering the temperature of the non paper-passing portion as compared with than the temperature of the paper-passing portion may be switched in accordance with the discriminated fixation. The non paper-passing portion temperature suppression/temperature control is control for suppressing power consumption by lowering the temperature of the heat-generating body of the non paper-passing portion in which paper does not pass when the recording-material width for paper passing is small. That is, respective control target temperatures of the plurality of heat generation blocks of the divided heater are individually set in accordance with the width direction size of the recording material passing through the fixing unit. For example, in the fixation of the recording material whose width is smaller than the maximum size, the control target temperature of the heat generation block at the end in the width direction may be set to a temperature lower than the control target temperature of the heat generation block on the inner side in the width direction of the heat generation block.

Moreover, control of non-image portion temperature suppression/temperature control in which the temperature of the heat generation block of a non-image portion which does not form an image is lowered as compared with the temperature of the heat generation block of an image portion may be switched in accordance with the discriminated fixation by the image information. The non-image portion temperature suppression/temperature control is control for suppressing power consumption together with the suppression of temperature rise on an end portion by lowering the temperature of the heat-generating body in the non-image portion which does not form an image for a portion on which a toner is not placed.

Control of error-mode determination control for discriminating whether the recording material with a size different from that specified by the user is passed or not on the basis of the recording-material width and the temperature of the heat generation block of the non paper-passing portion may be switched in accordance with the discriminated fixation. The error-mode determination control is control which determines that the size of the paper-passing recording material does not match the user-specified size when a temperature-rise amount (temperature-rise speed) for a certain period of time (1 [s], for example) of the heat-generating body, which is supposed to be the paper-passing portion from the size specified by the user, falls below the temperature-rise amount threshold value (10 [° C.], for example) in the case of paper passing. Moreover, it is control which determines an error mode when the temperature-rise amount for a certain period of time of the heat-generating body, which is supposed to be the non paper-passing portion from the size specified by the user, goes above the temperature-rise amount threshold value (5 [° C.], for example) in the case of non paper-passing.

Moreover, when it is determined to be the error mode, control of fixation cooling control in which the print is interrupted and cooling of the fixation is performed as a cooling operation may be switched in accordance with the discriminated fixation. The fixation cooling control is control of averaging the temperature of the heat-generating body by performing temperature control at a temperature lower than that at the print for a predetermined period of time (30 [s], for example).

Control of conveyance-speed optimization control which optimizes a throughput (number of passings of the recording material per unit time when a plurality of the recording materials are continuously passed) such as the conveyance speed or conveyance interval of the recording material in accordance with the recording-material width may be switched in accordance with the discriminated fixation. In the conveyance-speed optimization control, when the recording-material width is small, the temperature on the end portion of the fixer rises and thus, the print may be performed at a fast conveyance speed, and a rest time may be prolonged, for example. Alternatively, the print may be performed at a slow conveyance speed, and the rest time may be reduced. That is, it is the control of improving usability by selecting the optimal conveyance speed from the type of the fixing unit attached to the apparatus main-body, the type of the recording material passing through the fixing unit, the conveyance speed of the recording material and the length of the paper-feed time and the like.

As described above, by switching the control in accordance with the discriminated fixer, optimization of the failure determination, suppression of the power consumption, prevention of fixer breakage, improvement of usability and the like can be realized.

Embodiment 3

In Embodiment 3 of the present invention, a method of preventing erroneous discrimination in discrimination of the fixer will be explained. Since the configurations of the image forming apparatus and the image heating device in Embodiment 3 are similar to those in Embodiment 1, they will be omitted, here.

Table 3 illustrates an example of the data to be transmitted when the data transmitted by the transmitting unit 903 has the same data number for the fixing device 200 and the fixing device 600. When the transmitted data number is the same (that is, the number of pieces of the data to be transmitted is constant, regardless of the type of the fixing device), there is no more need to change a communication format depending on the number of thermistors, and common communication can be conducted. In the fixing device 200, the number of thermistors is four, that is, the thermistors T1 to T4. Thus, the data to be transmitted (a second number of pieces of the second temperature information) is the ID and the thermistor data 1 to 4 (corresponding temperature information corresponding to detected temperatures of the thermistors T1 to T4), and for the thermistor data 5 to 16 (non-corresponding temperature information not corresponding to the detected temperature of the thermistors T1 to T4), FFFF indicating no data is transmitted. In the fixing device 600, since the number of the thermistors is 14, the data to be transmitted (a first number of pieces of the first temperature information) is the ID and the thermistor data 1 to 14, and FFFF indicating no data is transmitted for the thermistor data 15, 16.

TABLE 3

| Item | Image heating device 200, Value [HEX] | Image heating device 600, Value [HEX] |
|---|---|---|
| ID | 0001 | 0002 |
| Thermistor data 1 | 003C | 0034 |
| Thermistor data 2 | 003A | 0039 |
| Thermistor data 3 | 0035 | 003B |
| Thermistor data 4 | 0034 | 003C |

TABLE 3-continued

| Item | Image heating device 200, Value [HEX] | Image heating device 600, Value [HEX] |
|---|---|---|
| Thermistor data 5 | FFFF | 003A |
| Thermistor data 6 | FFFF | 0038 |
| Thermistor data 7 | FFFF | 0033 |
| Thermistor data 8 | FFFF | 002A |
| Thermistor data 9 | FFFF | 002F |
| Thermistor data 10 | FFFF | 0031 |
| Thermistor data 11 | FFFF | 0032 |
| Thermistor data 12 | FFFF | 0030 |
| Thermistor data 13 | FFFF | 002E |
| Thermistor data 14 | FFFF | 0029 |
| Thermistor data 15 | FFFF | FFFF |
| Thermistor data 16 | FFFF | FFFF |
| CRC | 849E | 6619 |

Figure 12:
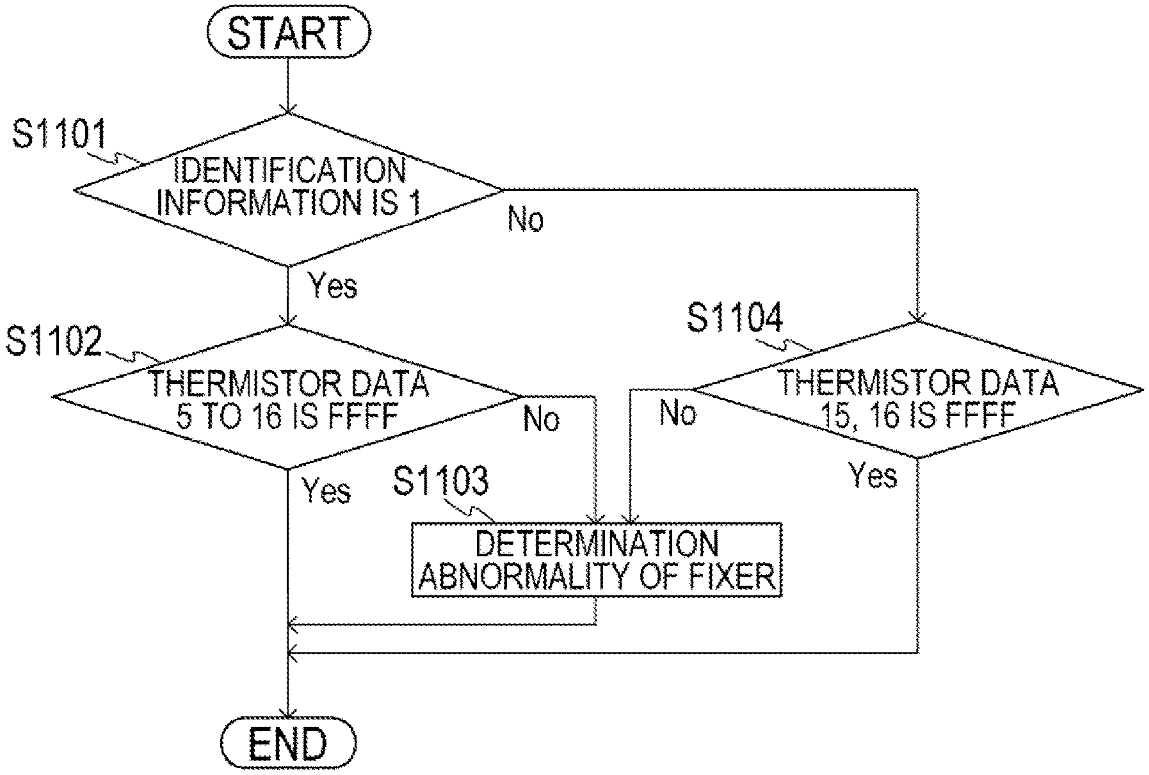
FIG. 12 is a determination-abnormality determining flowchart with thermistor data information in Embodiment 3.

FIG. 12 is a flowchart for performing determination abnormality of the fixer by using the identification information and the thermistor data when the fixing device 200 and the fixing device 600 have the same data number.

The identifying unit 905 determines whether the identification information is 1 or not by the TD of the received data (S1101). When the identification information is 1, it is determined whether the received thermistor data 5 to 16 is FFFF (S51102). If the received thermistor data 5 to 16 is not FFFF, determination abnormality processing of the fixer is executed (S1103). If the identification information is not 1, it is determined whether the received thermistor data 15, 16 is FFFF (S51104). If the received thermistor data 15, 16 is not FFFF, the determination abnormality processing of the fixer is executed (S1103). As described above, the determination abnormality of the fixer is determined by using the TD of the received data and the information of the thermistor data.

Here, the data is supposed to be the ID and the 16 pieces of the thermistor data, but the data number is not limited to that. Moreover, the value indicating no thermistor data as predetermined data is supposed to be FFFF, but other values may be used.

As a method of determining determination abnormality of the fixer, other methods may be used. For example, if the image heating device includes a non-volatile memory or the like, sub-identification information is recorded also in the non-volatile memory, the sub-identification information is read out of the non-volatile memory by reading unit of the apparatus main-body, and the ID of the received data is compared with the information in the non-volatile memory of the image heating device. The determination abnormality of the fixer may be determined by determining right/wrong of the combination of this ID and the sub-identification information.

Figure 13:
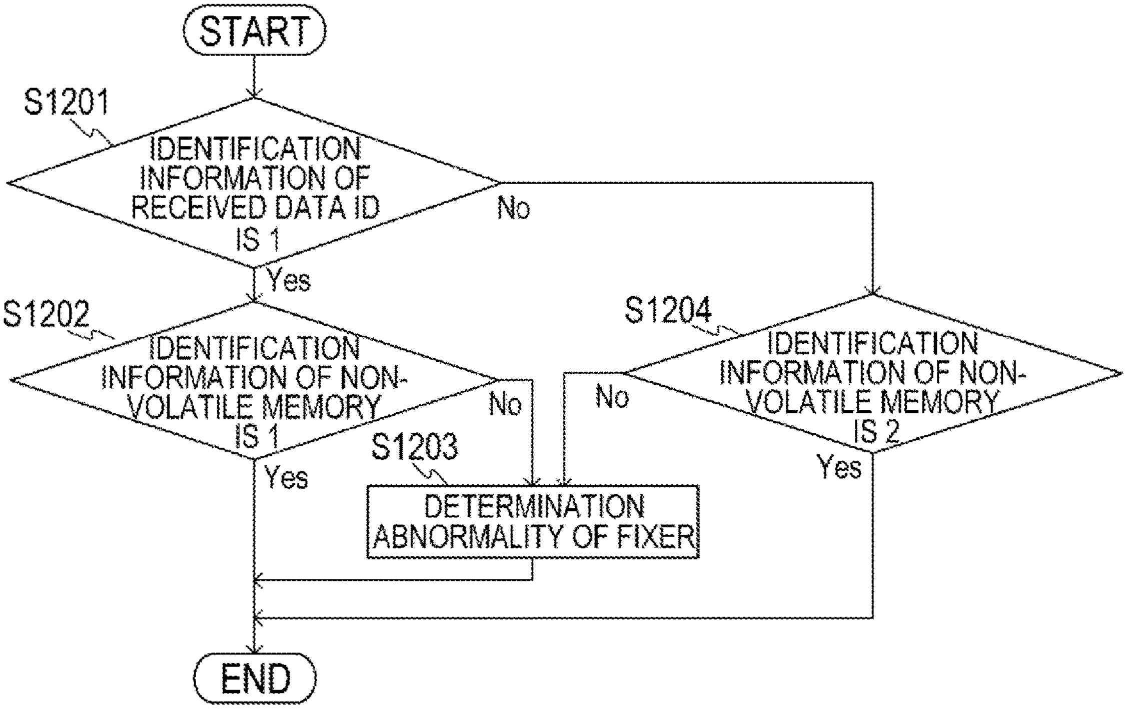
FIG. 13 is a determination-abnormality determining flowchart with non-volatile memory information in Embodiment 3.

FIG. 13 is a flowchart for determining the determination abnormality of the fixer by the ID of the received data and the information in the non-volatile memory of the image heating device. The identifying unit 905 determines whether the identification information of the received data ID is 1 or not (S1201). If the identification information is 1, it is determined whether the identification information (sub-identification information) of the non-volatile memory read out by the reading unit is 1 or not (S1202). If the identification information of the non-volatile memory is not 1, the determination abnormality processing of the fixer is executed (S1203). If the identification information of the received data ID is not 1, it is determined whether the identification information of the non-volatile memory is 2 or not (S1204). If the identification information of the non-volatile memory is not 1, the determination abnormality processing of the fixer is executed. Here, the case in which the identification information is 1 and 2 is explained, but this is not limiting.

Figure 14:
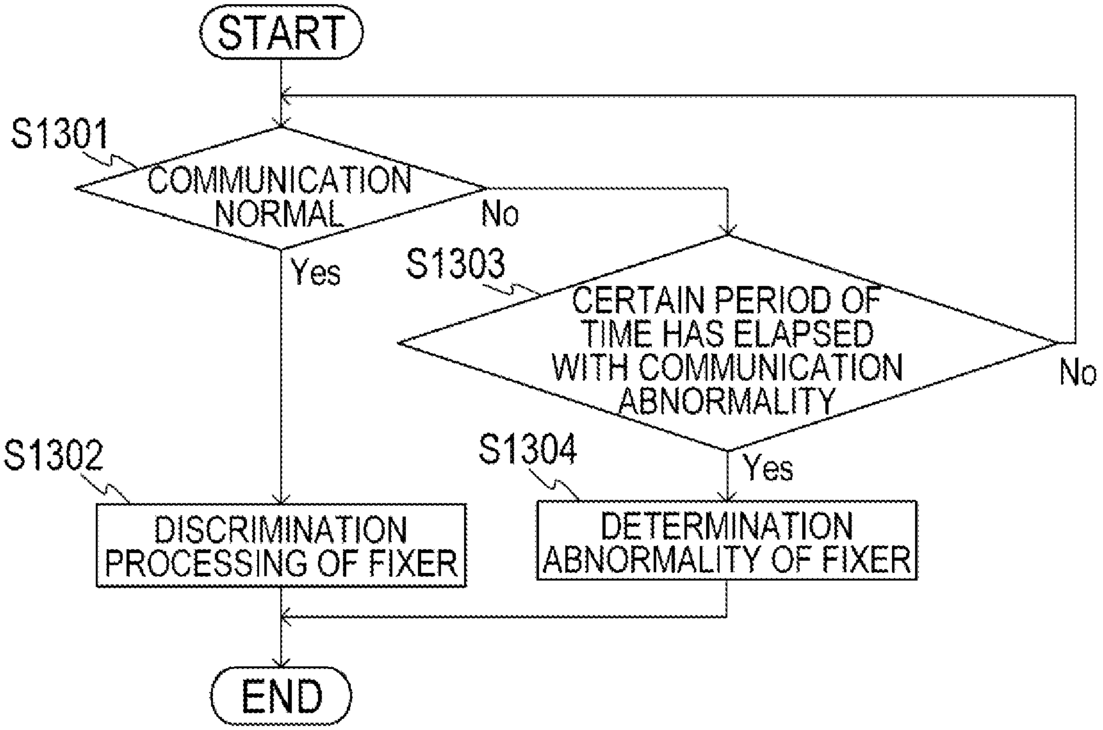
FIG. 14 is a determination-abnormality determining flowchart when communication is not possible for a certain period of time in Embodiment 3.

Moreover, if communication cannot be conducted for a certain period of time (100 [ms] as a predetermined period of time, for example), the determination abnormality of the fixer may be determined by assuming that the identification information cannot be determined. FIG. 14 is a flowchart for executing the determination abnormality processing of the fixer, when the communication cannot be conducted for the certain period of time. The acquiring unit 904 determines whether communication could be conducted normally (S1301). In the case of the normal communication, the discrimination processing of the fixer is executed (S1302). If not, it is determined whether the certain period of time has elapsed in the communication abnormality (S1303). If the certain period of time has not elapsed, the processing returns to the determination of the normal communication. If the certain period of time has elapsed, the determination abnormality processing of the fixer is executed (S1304).

Moreover, it was assumed that the identification information of the fixing device 200 is 1, the identification information of the fixing device 600 is 2, but if the data numbers to be transmitted are the same, an effective data number (number of pieces of the corresponding temperature information) itself may be used as the identification information. That is, the CPU 1 may discriminate the type of the fixing device attached to the apparatus main-body on the basis of the number of pieces of the effective data transmitted from the CPU 2.

Table 4 illustrates an example of the transmitted data in the case where the effective data number itself is used as the identification information. The effective data number is the thermistor data number excluding FFFF (non-corresponding temperature information) indicating no data. The effective data number of the fixing device 200 is 4, and the effective data number of the fixing device 600 is 14.

TABLE 4

| Item | Image heating device 200, Value [HEX] | Image heating device 600, Value [HEX] |
|---|---|---|
| Thermistor data 1 | 003C | 0034 |
| Thermistor data 2 | 003A | 0039 |
| Thermistor data 3 | 0035 | 003B |
| Thermistor data 4 | 0034 | 003C |
| Thermistor data 5 | FFFF | 003A |
| Thermistor data 6 | FFFF | 0038 |
| Thermistor data 7 | FFFF | 0033 |
| Thermistor data 8 | FFFF | 002A |
| Thermistor data 9 | FFFF | 002F |
| Thermistor data 10 | FFFF | 0031 |
| Thermistor data 11 | FFFF | 0032 |
| Thermistor data 12 | FFFF | 0030 |
| Thermistor data 13 | FFFF | 002E |
| Thermistor data 14 | FFFF | 0029 |
| Thermistor data 15 | FFFF | FFFF |
| Thermistor data 16 | FFFF | FFFF |
| CRC | 454D | 7C0D |

As described above, by using the information separate from the TD of the received data or by determining the determination abnormality of the fixer by the communication state, erroneous discrimination of the fixer can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-029562, filed on Feb. 28, 2022, and No. 2022-140091, filed on Sep. 2, 2022 which are hereby incorporated by reference herein in their entirety.

What is claimed is:

1. An image forming system comprising:

an apparatus main-body including an image forming portion configured to form an image on a recording material;

a control portion configured to control a fixing operation of fixing the image formed on the recording material; and a fixing unit attached to the apparatus main-body, wherein the fixing unit is one among:

a first fixing unit including:

a first heater including a plurality of heat generation blocks divided in a width direction, which is orthogonal to a conveyance direction of the recording material, each of the plurality of heat generation blocks being configured to be individually controlled;

a first temperature detection element that detects a temperature of the first heater; and a first information processing portion that acquires first temperature information related to a temperature detected by the first temperature detection element, wherein, in a state where the first fixing unit is attached to the apparatus main-body, the first information processing portion transmits first data including first identification information related to a type of the first fixing unit and the first temperature information to the control portion; and a second fixing unit including:

a second heater different from the first heater and including a single heat generation block corresponding to a maximum size of a recording material in the width direction;

a second temperature detection element that detects a temperature of the second heater; and a second information processing portion that acquires second temperature information related to a temperature detected by the second temperature detection element, and in a state where the second fixing unit is attached to the apparatus main-body, the second information processing portion transmits second data including second identification information related to a type of the second fixing unit and the second temperature information to the control portion, wherein the control portion discriminates that the fixing unit attached to the apparatus main-body is either:

the first fixing unit based on the first identification information included in the first data and controls the fixing operation by the first fixing unit based on the first temperature information included in the first data; or the second fixing unit based on the second identification information included in the second data and controls the fixing operation by the second fixing unit based on the second temperature information included in the second data.

2. The image forming system according to claim 1, further comprising:

an insulation communication unit configured to transmit the first data and the second data, wherein the first data from the first information processing portion is transmitted to the control portion via the insulation communication unit, and wherein the second data from the second information processing portion is transmitted to the control portion via the insulation communication unit.

3. The image forming system according to claim 1, wherein:

the first data includes a first error detection code corresponding to information included in the first data, the second data includes a second error detection code corresponding to information included in the second data, and the control portion:

determines, in a state where the first fixing unit is attached to the apparatus main-body, right/wrong of the first data based on the first error detection code, and in a state where the first data is determined to be correct, discriminates that the fixing unit attached to the apparatus main-body is the first fixing unit by the first identification information included in the first data; and determines, in a state where the second fixing unit is attached to the apparatus main-body, right/wrong of the second data based on the second error detection code, and in a state where that the second data is determined to be correct, discriminates that the fixing unit attached to the apparatus main-body is the second fixing unit by the second identification information included in the second data.

4. The image forming system according to claim 1, wherein:

the first data is configured of a first number of pieces of data, the second data is configured of a second number of pieces of data, which is different from the first number, and the control portion discriminates that:

in a state where the first fixing unit is attached to the apparatus main-body, the fixing unit attached to the apparatus main-body is the first fixing unit based on the first number of pieces of data transmitted from the first information processing portion being the first number; and in a state where the second fixing unit is attached to the apparatus main- body, the fixing unit attached to the apparatus main-body is the second fixing unit based on the second number of pieces of data transmitted from the second information processing portion being the second number.

5. The image forming system according to claim 1, wherein, in a state where the first fixing unit is attached to the apparatus main-body, the control portion individually sets a first control target temperature of the first heater to each of the plurality of heat generation blocks in accordance with a size in the width direction of the recording material passing through the first fixing unit.

6. The image forming system according to claim 5, wherein:

the plurality of heat generation blocks include a first heat generation block and a second heat generation block, the first heat generation block is disposed at an end in the width direction in the plurality of heat generation blocks, and the second heat generation block is disposed on an inner side from the first heat generation block in the width direction in the plurality of heat generation blocks; and in a state where the first fixing unit is attached to the apparatus main-body and a recording material, with a size smaller than the size in the width direction of the recording material with the maximum size, passes through the first fixing unit, the control portion sets the first control target temperature of the first heat generation block to a temperature lower than the first control target temperature of the second heat generation block.

7. The image forming system according to claim 6, wherein:

the control portion detects whether the size of the recording material passing through the first fixing unit matches the size specified by a user or not based on a temperature of the first heat generation block and a temperature of the second heat generation block detected by the first temperature detection element, and in a state where the control portion detects that the size of the recording material passing through the first fixing unit does not match the size specified by the user, the control portion interrupts an image forming operation and performs a cooling operation for cooling the first fixing unit.

8. The image forming system according to claim 1, wherein, in a state where the first fixing unit is attached to the apparatus main-body, the control portion individually sets a first control target temperature of the first heater to each of the plurality of heat generation blocks in accordance with a range in the width direction of a toner image formed on the recording material passing through the first fixing unit.

9. The image forming system according to claim 8, wherein:

the plurality of heat generation blocks include a first heat generation block and a second heat generation block, the second heat generation block is disposed not at a position corresponding to a toner image formed on the recording material passing through the first fixing unit in the plurality of heat generation blocks, the second heat generation block is disposed at a position corresponding to the toner image in the plurality of heat generation blocks, and in the state where the first fixing unit is attached to the apparatus main-body, the control portion sets the first control target temperature of the first heat generation block to a temperature lower than the first control target temperature of the second heat generation block.

10. The image forming system according to claim 1, wherein the control portion:

sets, in a state where the first fixing unit is attached to the apparatus main-body, the number of recording materials passing per unit time in the plurality of recording materials passing through the first fixing unit in accordance with a type of the recording material passing through the first fixing unit; and sets, in a state where the second fixing unit is attached to the apparatus main-body, the number of recording materials passing per unit time in the plurality of recording materials passing through the second fixing unit in accordance with a type of the recording material passing through the second fixing unit.

11. The image forming system according to claim 1, wherein:

the first fixing unit includes a first number of ones of the first temperature detection element, the second fixing unit includes a second number, which is different from the first number, of ones of the second temperature detection element, and the control portion:

in a state where the control portion discriminates that the fixing unit attached to the apparatus main-body is the first fixing unit, detects presence/absence of a failure of the first temperature detection element based on the number of pieces of the first temperature information included in the first data transmitted from the first information processing portion; and in a state where the control portion discriminates that the fixing unit attached to the apparatus main-body is the second fixing unit, detects presence/absence of a failure of the second temperature detection element based on the number of pieces of the second temperature information included in the second data transmitted from the second information processing portion.

12. The image forming system according to claim 1, wherein the control portion:

detects, in a state where the first fixing unit is attached to the apparatus main-body, presence/absence of a failure of the first temperature detection element based on a temperature-rise speed of the temperature detected by the first temperature detection element while the first heater is electrically conducting; and detects, in a state where the second fixing unit is attached to the apparatus main-body, presence/absence of a failure of the second temperature detection element based on a temperature-rise speed of the temperature detected by the second temperature detection element while the second heater is electrically conducting.

13. The image forming system according to claim 1, wherein:

the first fixing unit includes a first number of ones of the first temperature detection element, the second fixing unit includes a second number of ones of the second temperature detection element, the first data includes a first number of pieces of the first temperature information larger in the number than the first number of the first temperature detection elements, the second data includes a second number of pieces of the second temperature information larger in the number than the second number of the second temperature detection elements, the first number of pieces of the first temperature information include corresponding temperature information corresponding to a temperature detected by the first number of the first temperature detection elements and non-corresponding temperature information not corresponding thereto, the second number of pieces of the second temperature information include corresponding temperature information corresponding to a temperature detected by the second number of the second temperature detection elements and non-corresponding temperature information not corresponding thereto, and the control portion:

detects, in a state where the first fixing unit is attached to the apparatus main-body, presence/absence of a failure of the first fixing unit attached to the apparatus main-body based on whether the non-corresponding temperature information included in the first data transmitted from the first information processing portion is predetermined data or not; and detects, in a state where the second fixing unit is attached to the apparatus main-body, presence/absence of a failure of the second fixing unit attached to the apparatus main-body based on whether the non-corresponding temperature information included in the second data transmitted from the second information processing portion is predetermined data or not.

14. The image forming system according to claim 13, wherein the first number of pieces of data configuring the first data and the second number of pieces of data configuring the second data are the same.

15. The image forming system according to claim 1, wherein:

the first fixing unit further includes a first non-volatile memory that records first sub-identification information, the second fixing unit further includes a second non-volatile memory that records second sub-identification information, and the control portion:

detects, in a state where the first fixing unit is attached to the apparatus main-body, presence/absence of a failure of the first fixing unit by right/wrong of a combination of the first identification information that the first fixing unit attached to the apparatus main-body includes and the first sub-identification information recorded in the first non-volatile memory; and detects, in a state where the second fixing unit is attached to the apparatus main-body, presence/absence of a failure of the second fixing unit by right/wrong of a combination of the second identification information that the second fixing unit attached to the apparatus main-body includes and the second sub-identification information recorded in the second non-volatile memory.

16. The image forming system according to claim 1, wherein the control portion:

determines, in a state where the first fixing unit is attached to the apparatus main-body, that the first fixing unit has a failure, in a state where the first data is not transmitted from the first information processing portion, even where a predetermined period of time has elapsed since the first fixing unit was attached to the apparatus main-body; and determines, in a state where the second fixing unit is attached to the apparatus main-body, that the second fixing unit has a failure, in a state where the second data is not transmitted from the second information processing portion, even where the predetermined period of time has elapsed since the second fixing unit was attached to the apparatus main-body.

17. An image forming apparatus comprising:

an image forming portion configured to form an image on a recording material;

a control portion configured to control a fixing operation of fixing the image on the recording material; and a fixing unit including:

a heater including a plurality of heat generation blocks divided in a width direction, which is orthogonal to a conveyance direction of the recording material, each of the plurality of heat generation blocks being configured to be individually controlled;

a temperature detection element that detects a temperature of the heater; and an information processing portion that acquires temperature information related to a temperature detected by the temperature detection element, wherein the information processing portion transmits data including identification information related to a type of the fixing unit and the temperature information to the control portion, wherein the control portion discriminates a type of the fixing unit based on the identification information included in the data and controls the fixing operation by the fixing unit based on the temperature information included in the data.

18. The image forming apparatus according to claim 17, further comprising an insulation communication unit configured to transmit the data from the information processing portion to the control portion.

19. The image forming apparatus according to claim 17, wherein:

the data includes an error detection code corresponding to information included in the data, the control portion determines right/wrong of the data based on the error detection code, and in a state where the control portion determines that the data is correct, the control portion discriminates the type of the fixing unit based on the identification information included in the data.

20. The image forming apparatus according to claim 17, wherein:

the information processing portion transmits data to the control portion in different number of pieces in accordance with the type of the fixing unit, and the control portion discriminates the type based on the number of pieces of the data transmitted from the information processing portion.

21. The image forming apparatus according to claim 17, wherein the control portion sets the number of recording materials passing per unit time in a plurality of the recording materials passing through the fixing unit in accordance with the type of the fixing unit or a type of the recording material passing through the fixing unit.

22. The image forming apparatus according to claim 17, wherein the control portion detects presence/absence of a failure of the temperature detection element based on:

a number of pieces of the temperature information included in the data transmitted from the information processing portion of the fixing unit, or a temperature-rise speed of the temperature detected by the temperature detection element while the heater is electrically conducting.

23. The image forming apparatus according to claim 17, wherein:

the fixing unit includes a plurality of temperature detection elements, including the temperature detection element, the data includes a plurality of pieces of the temperature information larger in number than the number of the plurality of temperature detection elements provided in the fixing unit, the plurality of pieces of the temperature information include corresponding temperature information corresponding to a temperature detected by each temperature detection element and non-corresponding temperature information not corresponding thereto, the control portion detects presence/absence of a failure of the fixing unit based on whether the non-corresponding temperature information included in the data transmitted from the information processing portion is predetermined data or not, and the information processing portion transmits a certain number of pieces of data to the control portion, regardless of the type of the fixing unit.

24. The image forming apparatus according to claim 17, wherein:

the fixing unit further includes a non-volatile memory that records sub-identification information, and the control portion detects presence/absence of a failure of the fixing unit by right/wrong of a combination of the identification information included in the data and the sub-identification information recorded in the non-volatile memory.

25. The image forming apparatus according to claim 17, wherein the control portion determines that the fixing unit has a failure, in a state where the data is not transmitted from the information processing portion even where a predetermined period of time has elapsed.

26. A fixing device attachable to an image forming apparatus, the fixing unit comprising:

a heater including a plurality of heat generation blocks divided in a width direction, which is orthogonal to a conveyance direction of a recording material, each of the plurality of heat generation blocks being configured to be individually controlled;

a temperature detection element that detects a temperature of the heater; and an information processing portion that acquires temperature information related to a temperature detected by the temperature detection element, the information processing portion transmitting data including identification information related to a type of the fixing device and the temperature information to the image forming apparatus in a state where the fixing unit is attached to the image forming apparatus.

27. An image forming system comprising:

an apparatus main-body including an image forming portion that forms an image on a recording material; and a control portion configured to control a fixing operation of fixing the image formed on the recording material, a fixing unit attachable to the apparatus main-body, wherein the fixing unit is one among:

a first fixing unit including:

a first heater;

a plurality of first temperature detection elements that detect a temperature of the first heater; and a first information processing portion that acquires first temperature information related to a temperature detected by the plurality of first temperature detection elements, and in a state where the first fixing unit is attached to the apparatus main-body, the first information processing portion transmits first data including the first temperature information to the control portion; and a second fixing unit including:

a second heater different from the first heater;

a plurality of second temperature detection elements that detect a temperature of the second heater; and a second information processing portion that acquires second temperature information related to a temperature detected by the plurality of second temperature detection elements, and in a state where the second fixing unit is attached to the apparatus main-body, the second information processing portion transmits second data including the second temperature information to the control portion, wherein the first temperature information is a plurality of pieces of corresponding temperature information corresponding to a temperature detected by the plurality of first temperature detection elements, wherein the second temperature information is a plurality of pieces of corresponding temperature information corresponding to a temperature detected by the plurality of second temperature detection elements, wherein the number of pieces of the corresponding temperature information included in the first data and the number of pieces of the corresponding temperature information included in the second data are different, wherein at least one of the first data or the second data includes non-corresponding temperature information in addition to the corresponding temperature information, and wherein the control portion discriminates that the fixing unit attached to the apparatus main-body is either:

the first fixing unit based on the number of pieces of the corresponding temperature information included in the first data and controls the fixing operation by the first fixing unit based on the first temperature information included in the first data, or the second fixing unit based on the number of pieces of the corresponding temperature information included in the second data and controls the fixing operation by the second fixing unit based on the second temperature information included in the second data.

28. The image forming system according to claim 27, wherein the total number of the number of pieces of the corresponding temperature information and the number of pieces of the non-corresponding temperature information included in the first data and the total number of the number of pieces of the corresponding temperature information and the number of pieces of the non-corresponding temperature information included in the second data are the same.

* * * * *